(12) United States Patent
Chung et al.

(10) Patent No.: US 11,818,484 B2
(45) Date of Patent: Nov. 14, 2023

(54) IMAGING DEVICE

(71) Applicant: Samsung Electronics Co., Ltd., Suwon-si (KR)

(72) Inventors: Bumsik Chung, Seoul (KR); Minsun Keel, Seoul (KR); Myoungoh Ki, Seongnam-si (KR); Daeyun Kim, Asan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 38 days.

(21) Appl. No.: 17/381,777

(22) Filed: Jul. 21, 2021

(65) Prior Publication Data

US 2022/0166946 A1 May 26, 2022

(30) Foreign Application Priority Data

Nov. 26, 2020 (KR) .................. 10-2020-0161099

(51) Int. Cl.
*H04N 25/75* (2023.01)
*G01S 17/89* (2020.01)
(Continued)

(52) U.S. Cl.
CPC ........... *H04N 25/75* (2023.01); *G01S 7/4808* (2013.01); *G01S 17/26* (2020.01); *G01S 17/89* (2013.01);
(Continued)

(58) Field of Classification Search
CPC .... H04N 5/378; H04N 5/23229; H04N 5/341; H04N 5/3765; H04N 5/232; H04N 5/353;
(Continued)

(56) References Cited

U.S. PATENT DOCUMENTS

2001/0048519 A1  12/2001  Bamji et al.
2011/0254923 A1  10/2011  Choi et al.
(Continued)

FOREIGN PATENT DOCUMENTS

JP  2019-132640 A  8/2019

OTHER PUBLICATIONS

Adrian P. P. Jongenelen, et al. "Analysis of Errors in ToF Range Imaging With Dual-Frequency Modulation", IEEE Transactions on Instrumentation and Measurement, vol. 60, No. 5, May 2011.

*Primary Examiner* — Nhan T Tran
(74) *Attorney, Agent, or Firm* — Harness, Dickey & Pierce, P.L.C.

(57) ABSTRACT

An imaging device includes a light source operated by an optical control signal generated using a first reference signal having a first frequency and a second reference signal, having a second frequency different from the first frequency, a plurality of pixels, each of the plurality of pixels including a pixel circuit outputting a pixel signal corresponding to the electrical charge of a photodiode, and a logic circuit configured to generate raw data to generate a depth image, using the pixel signal. The plurality of pixels include first pixels and second pixels, and the logic circuit inputs a first photo control signal, having the first frequency, to the pixel circuit connected to a photodiode in each of the first pixels, and inputs a second photo control signal, having the second frequency, to the pixel circuit connected to a photodiode in each of the second pixels.

20 Claims, 20 Drawing Sheets

(51) Int. Cl.
*G01S 17/26* (2020.01)
*G01S 7/48* (2006.01)
*H04N 23/80* (2023.01)
*H04N 25/40* (2023.01)
*H04N 25/71* (2023.01)

(52) U.S. Cl.
CPC ............ *H04N 23/80* (2023.01); *H04N 25/40* (2023.01); *H04N 25/745* (2023.01)

(58) Field of Classification Search
CPC ............ H04N 5/36961; H04N 5/2256; H04N 5/232411; H04N 5/04; H04N 5/36965; H04N 5/357; G01S 7/4808; G01S 17/26; G01S 17/89; G01S 7/4865; G01S 17/894
See application file for complete search history.

(56) References Cited

U.S. PATENT DOCUMENTS

| | | | |
|---|---|---|---|
| 2013/0321584 A1* | 12/2013 | Choi | G01S 17/894 348/46 |
| 2014/0168369 A1* | 6/2014 | Crane | G01S 17/36 348/46 |
| 2015/0362698 A1* | 12/2015 | Lansel | H04N 9/04557 348/360 |
| 2019/0293792 A1 | 9/2019 | Keel et al. | |
| 2020/0013811 A1* | 1/2020 | Jin | H01L 27/14812 |
| 2020/0103511 A1 | 4/2020 | Jin et al. | |
| 2020/0209392 A1 | 7/2020 | Sadhu et al. | |
| 2020/0217931 A1 | 7/2020 | Lawrenson et al. | |
| 2020/0314376 A1* | 10/2020 | Kim | G01S 7/4865 |
| 2021/0041534 A1 | 2/2021 | Egawa | |
| 2022/0043129 A1* | 2/2022 | Hu | G01S 17/10 |

* cited by examiner

IMAGING DEVICE

CROSS-REFERENCE TO RELATED APPLICATION(S)

This application claims the benefit under 35 USC 119(a) of Korean Patent Application No. 10-2020-0161099 filed on Nov. 26, 2020 in the Korean Intellectual Property Office, the entire disclosure of which is incorporated herein by reference for all purposes.

BACKGROUND

Some example embodiments relate to an imaging device.

Imaging devices are devices generating images by converting optical signals into electrical signals, and may be mounted on electronic devices to provide camera functions. Recently, an imaging device generating a depth image including distance information using an optical signal has been mounted on various electronic devices, and methods for improving the performance of an imaging device generating a depth image have been actively proposed.

SUMMARY

Some example embodiments provide an imaging device in which a depth image having improved or excellent noise characteristics may be generated, while increasing a large or maximum measurable distance without lowering a frame rate.

According to some example embodiments, an imaging device includes a light source configured to be operated by an optical control signal that is generated using a first reference signal having a first frequency and using a second reference signal having a second frequency different from the first frequency, a plurality of pixels, each of the plurality of pixels including a photodiode configured to generate an electrical charge in response to a light reception signal output by the light source and reflected from a subject, and a pixel circuit configured to output a pixel signal corresponding to the electrical charge of the photodiode, and a logic circuitry configured to generate raw data to generate a depth image using the pixel signal. The plurality of pixels includes first pixels and second pixels. The logic circuitry is configured to input a first photo control signal having the first frequency to the pixel circuit connected to the photodiode in each of the first pixels, and is configured to input a second photo control signal having the second frequency to the pixel circuit connected to the photodiode in each of the second pixels.

According to some example embodiments, an imaging device includes a light source configured to be operated by an optical control signal generated using a first reference signal having a first frequency and using a second reference signal having a second frequency different from the first frequency, a sensor including a plurality of pixels configured to generate a pixel signal in response to a light reception signal output by the light source and reflected from a subject and a logic circuitry configured to generate raw data using the pixel signal, the plurality of pixels including first pixels configured to operate in synchronization with first photo control signals having the first frequency and second pixels configured to operate in synchronization with second photo control signals having the second frequency, and an image processor configured to calculate distance information of the subject, using the raw data. The raw data includes first raw data corresponding to the first pixels and second raw data corresponding to the second pixels. The image processor is configured to calculate the distance information of the subject, and then correct the second raw data using the first raw data corresponding to two or more first neighboring pixels adjacent to each of the second pixels from among the first pixels.

According to some example embodiments, an imaging device includes a clock driver circuitry configured to output first photo control signals having a first frequency, and second photo control signals having a second frequency lower than the first frequency, a pixel array having first pixels configured to receive the first photo control signals and second pixels configured to receive the second photo control signals, a readout circuitry connected to the pixel array through a plurality of column lines, and a light source configured to be controlled by an optical control signal having a second frequency and different from the second photo control signal.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION OF SOME EXAMPLE EMBODIMENTS

Hereinafter, some example embodiments will be described with reference to the accompanying drawings.

Figure 1:
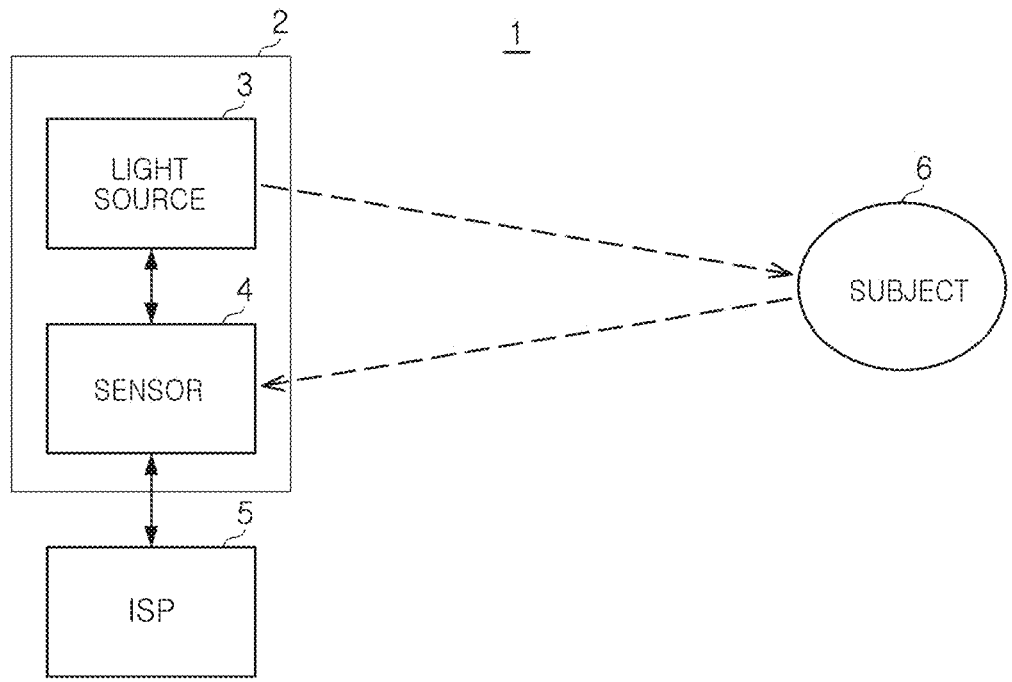
FIGS. 1 and 2 are block diagrams schematically illustrating an imaging device according to some example embodiments.
Figure 2:
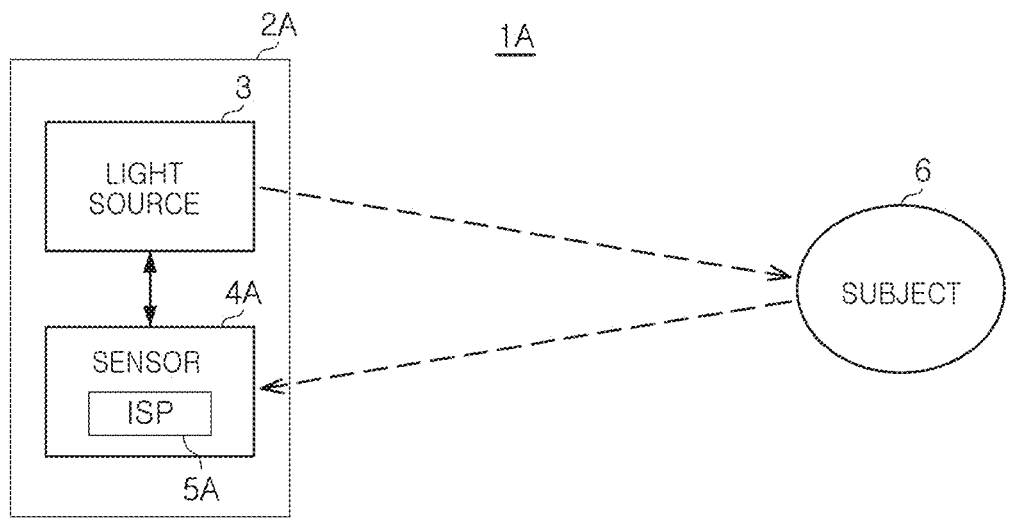

FIGS. 1 and 2 are block diagrams schematically illustrating an imaging device according to some example embodiments.

First, referring to FIG. 1, an imaging device 1 according to some example embodiments may include a sensor module 2, an image signal processor 5, and the like. The sensor module 2 may include a light source 3 and a sensor 4. The sensor module 2 and the image signal processor 5 may be included in different semiconductor devices. As an example, the sensor module 2 may be implemented in the form of a semiconductor package including the light source 3 and the sensor 4, and the image signal processor 5 may be included in a semiconductor device connected to the sensor module 2 to enable communication therewith through a predetermined interface, for example, included in at least one of an application processor, a central processing unit, a system-on-chip, or the like.

The light source 3 may include at least one light-emitting device that outputs an optical signal of a specific (or, alternatively, predetermined) wavelength band, and the light-emitting device may be implemented by a Vertical Cavity Surface Emitting Laser (VCSEL) or a Light Emitting Diode (LED). For example, when the light source 3 includes a plurality of light-emitting devices, the light-emitting devices may be disposed in an array form on a substrate. The light source 3 may further include an optical element and the like disposed in the path of the optical signal to improve the characteristics of the optical signal. For example, the optical signal output by the light source 3 may be an optical signal in an infrared wavelength band, e.g. having a wavelength of between 780 mm and 1 mm, or a frequency of between 300 GHz to 400 THz.

The light source 3 may be operated by two or more optical control signals having different operating frequencies. For example, the light source 3 may operate during a first light emission time by a first optical control signal having a first frequency, and additionally may operate during a second light emission time by a second optical control signal having a second frequency different from the first frequency. Alternatively, the first light source operated by the first optical control signal and the second light source operated by the second optical control signal may also be included in the light source 3. In this case, the first light source and the second light source may operate alternately, e.g. may not necessarily operate at the same time.

The light signal output by the light source 3 is reflected by a subject 6, and a light reception signal reflected by the subject 6 may be incident on the sensor 4. The sensor 4 may include pixels that generate an electrical signal in response to a light reception signal, a logic circuit that generates raw data required to/used to generate a result image using the electrical signal, and/or the like. The raw data may include depth information indicating a distance between the subject 6 and the background around the subject 6 (not illustrated). The image signal processor 5 generates a result image using raw data, and the result image may be or may include a depth image indicating a distance to the subject 6 and the background around the subject 6.

Next, referring to FIG. 2, a sensor module 2A and an image signal processor 5A of an imaging device 1A may be implemented in/within a single package. Referring to FIG. 2, a light source 3, a sensor 4A, and the image signal processor 5A may all be included in one semiconductor package. The image signal processor 5A may be included in the sensor 4A, or may be implemented separately from the sensor 4A.

In some example embodiments, for example those illustrated in FIGS. 1 and 2, the image signal processors 5 and 5A may be implemented in software and/or hardware. As an example, when the image signal processor 5 is implemented separately from the sensor module 2 as in example embodiments illustrated in FIG. 1, the image signal processor 5 may be implemented as software inside of an application processor or the like. Alternatively or additionally, when the image signal processor 5A is integrated into the sensor module 2A as in example embodiments illustrated in FIG. 2, the image signal processor 5A may be implemented as hardware.

Figure 3:
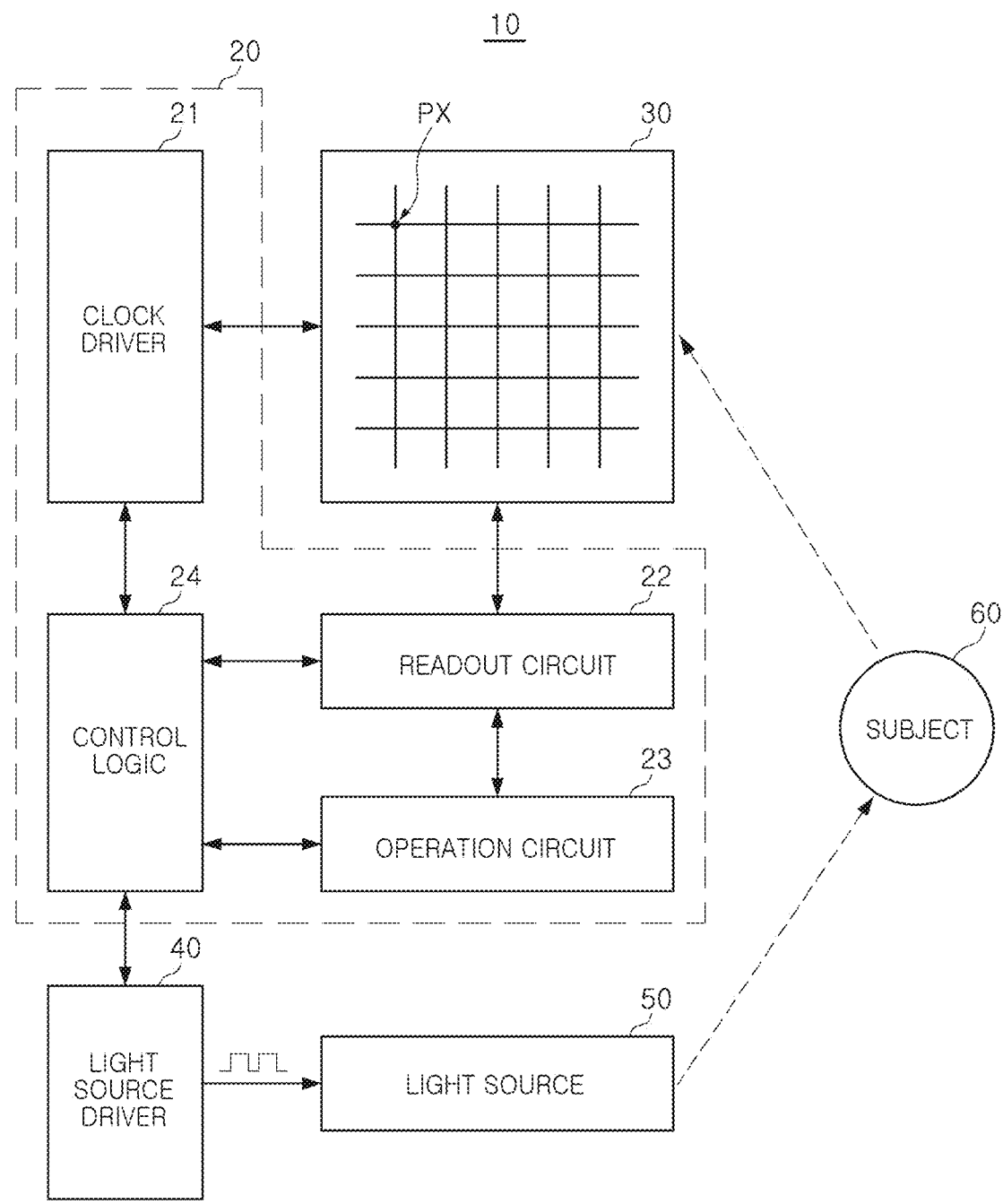
FIG. 3 is a schematic block diagram of an imaging device according to some example embodiments.

FIG. 3 is a schematic block diagram of an imaging device according to some example embodiments.

Referring to FIG. 3, an imaging device 10 may include a logic circuit 20, a pixel array 30, a light source driver 40, a light source 50, and the like. The pixel array 30 may include a plurality of pixels PX arranged in an array shape such as a rectangular or square shape having a plurality of rows and a plurality of columns. Each of the plurality of pixels PX may include a photodiode that generates electrical charge in response to a light reception signal incident from a subject 60, and a pixel circuit that generates an electric signal corresponding to the electrical charge generated by the photodiode.

For example, the pixel circuit may include a floating diffusion area/node/region, a transfer transistor, a reset transistor, a driving transistor, a selection transistor, and/or the like. The configuration of the pixels PX may vary depending one example embodiments. For example, each of the pixels PX may include an organic photodiode including an organic material, unlike a silicon photodiode, and/or may be implemented as a digital pixel. When the pixels PX are implemented as digital pixels, each of the pixels PX may include a comparator, a counter that converts the output of the comparator into a digital signal and outputs the converted signal, and/or the like.

The logic circuit 20 may include a plurality of circuits for controlling the pixel array 30. For example, the logic circuit 20 may include a clock driver 21, a readout circuit 22, an operation circuit 23, a control logic 24, and/or the like. The clock driver 21 may drive the pixel array 30 in the first direction and/or the second direction. For example, the clock driver 21 may generate a transmission control signal input to a transfer gate of the pixel circuit, a reset control signal input to the reset gate, a selection control signal input to a selection gate, a photo control signal input to a photo gate, and/or the like. The first direction and the second direction may be defined in various manners. For example, the first direction may correspond to a row direction and the second direction may correspond to a column direction.

The read-out circuit 22 may include a correlated double sampler (CDS), an analog-to-digital converter (ADC), and/or the like. The correlated double sampler is connected to pixels PX selected by a clock signal supplied by the clock driver 21 through column lines, and performs correlated double sampling to detect a reset voltage and a pixel voltage. The analog-to-digital converter may convert the reset voltage and the pixel voltage detected by the correlated double sampler into digital signals and may transfer the converted signals to the operation circuit 23.

The operation circuit 23 may include an amplifying circuit and a latch or buffer circuit for temporarily storing a digital signal, and may process a digital signal received from the read-out circuit 22. The clock driver 21, the readout circuit 22, and the operation circuit 23 may be controlled by the control logic 24. The control logic 24 may include a timing controller for controlling the operation timing of the clock driver 21, the readout circuit 22 and the operation circuit 23, an image signal processor for processing image data, and the like. In some example embodiments, the operation circuit 23 may be included in the control logic 24.

The control logic 24 may signal-process data output by the readout circuit 22 and the operation circuit 23 to generate raw data for generating a result image. For example, the result image generated by raw data may be or may include a depth image. When an image signal processor is included in the control logic 24, the control logic 24 may generate a result image using raw data.

According to some example embodiments, the control logic 24 may calculate a distance between the subject 60 and the imaging device 10 using the data output by the readout circuit 22 and the operation circuit 23 based on the operation mode of the imaging device 10, or may recognize the subject 60 close to the imaging device 10. Alternatively or additionally, the operation circuit 23 may generate the depth image, and the control logic 24 may post-process the depth image, thereby improving the quality of the result image.

Although FIG. 3 illustrates each of the clock driver 21, the control logic 24, the readout circuit 22, and the operation circuit 23 as separate components, example embodiments are not limited thereto. For example, some of the functions performed by one of the clock driver 21, the control logic 24, the readout circuit 22, and the operation circuit 23 may alternatively or additionally be performed by another one or more of the clock driver 21, the control logic 24, the readout circuit 22, and the operation circuit 23.

The imaging device 10 may include a light source 50 that outputs an optical signal to the subject 60. The light source 50 may include at least one light emitting device, and for example, may include a semiconductor chip in which a plurality of light emitting devices are arranged in an array form. The light source 50 may be operated by the light source driver 40. The light source driver 40 may be controlled by the logic circuit 20; however, example embodiments are not limited thereto.

In some example embodiments, the light source driver 40 may drive the light source 50 by generating an optical control signal having a pulse signal characteristic. The light source driver 40 may generate an optical control signal using a pulse width modulation (PWM) signal in response to a control command of the logic circuit 20 and may determine at least one of a frequency, a duty ratio, a duration, and the like of the optical control signal. For example, the logic circuit 20 may synchronize at least one of the clock signals input to the pixel array 30 by the clock driver 21 with an optical control signal input to the light source 50. In some example embodiments, the signal synchronized with the optical control signal input to the light source 50 may be or may include a photo control signal input to the pixels PX by the clock driver 21. The photo control signal may be or may include a signal for controlling on/off switching of a transistor connected between the floating diffusion and the photodiode of each of the pixels PX.

A large, e.g. a maximum distance that the imaging device 10 may measure may be determined according to the frequency of the optical control signal input to the light source 50 by the light source driver 40. For example, the relationship between the frequency of the optical control signal and the maximum distance that the imaging device 10 may measure may be determined as illustrated in Equation 1. In Equation 1, c may be the speed of light, $d_m$ may be a maximum distance measurable by the imaging device 10, and $f_m$ may be a frequency of the optical control signal.

$$d_m = \frac{c}{2f_m} \quad \text{[Equation 1]}$$

In more detail, the maximum distance that the imaging device 10 may measure may be inversely proportional to the frequency of the optical control signal. Therefore, the maximum distance that the imaging device 10 may measure may be increased in a manner that reduces the frequency of the optical control signal.

However, the photo control signal input to the pixels PX of the imaging device 10 may have the same frequency as the optical control signal, and therefore, in a case in which the frequency of the optical control signal decreases, noise characteristics of the depth image generated by the imaging device 10 may be deteriorated. To prevent or reduce the likelihood of occurrence of such a problem, one depth image may also be generated with data obtained by respectively driving the light source 50 with an optical control signal of a first frequency during a first frame period and the light source 50 with an optical control signal of a second frequency different from the first frequency during a second frame period. However, in such a case, the frame rate of the imaging device 10 may be reduced, and in a case in which the object moves between the first frame period and the second frame period, the depth image may not be or may less accurately be generated.

In some example embodiments of inventive concepts, to prevent or reduce the likelihood or impact of the above problem, the light source 50 may be driven using an optical control signal generated using a first reference signal of a first frequency and a second reference signal of a second frequency. Alternatively or additionally, a depth image may be generated by driving first pixels with a first photo control signal of a first frequency and driving second pixels with a second photo control signal of a second frequency. Accordingly, while increasing a large/the maximum distance measurable by the imaging device 10, deterioration in noise characteristics of the depth image output by the imaging device 10 may be significantly reduced.

Figure 4A:
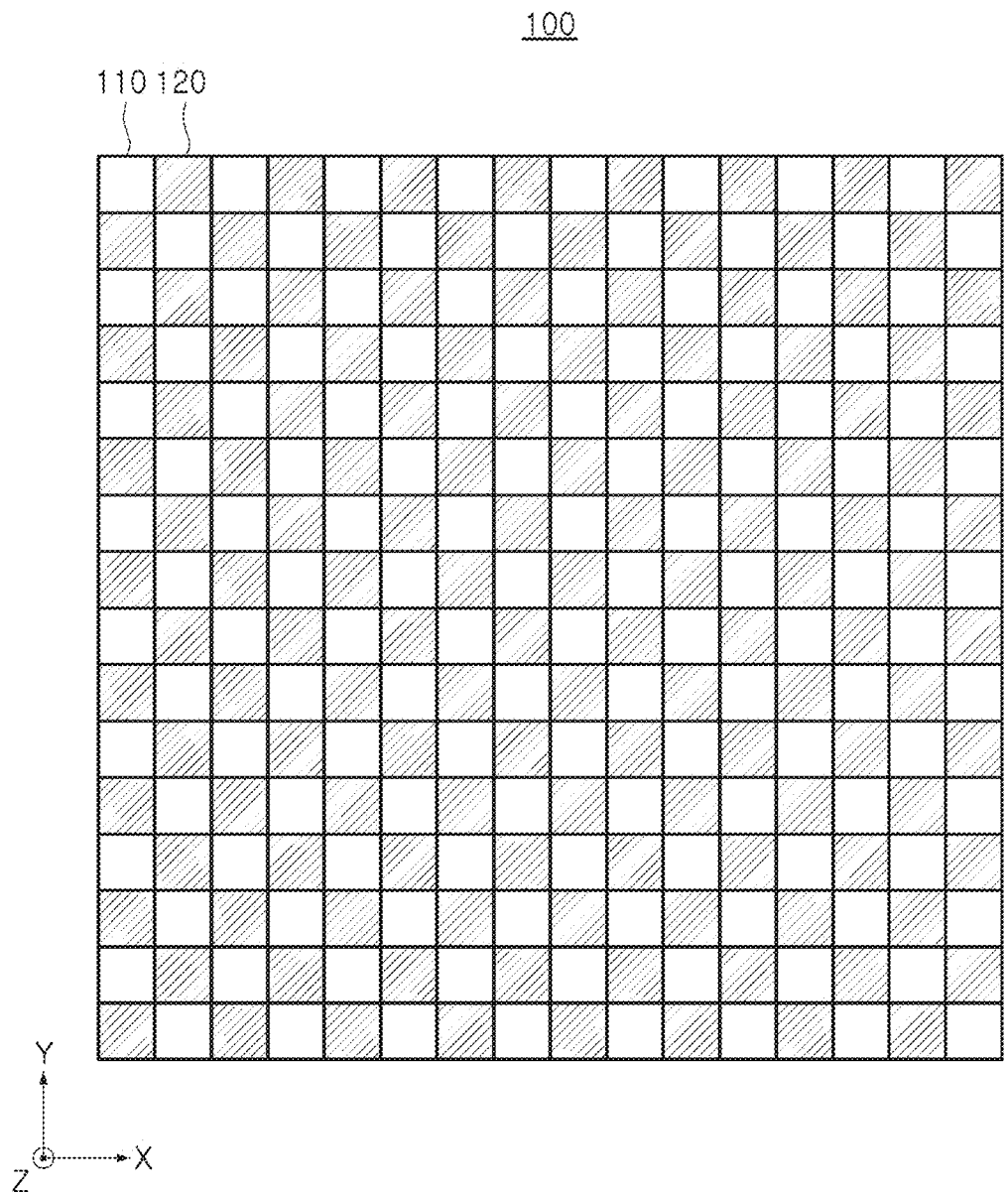
FIGS. 4A and 4B are schematic diagrams illustrating a pixel array included in an imaging device according to some example embodiments.
Figure 4B:
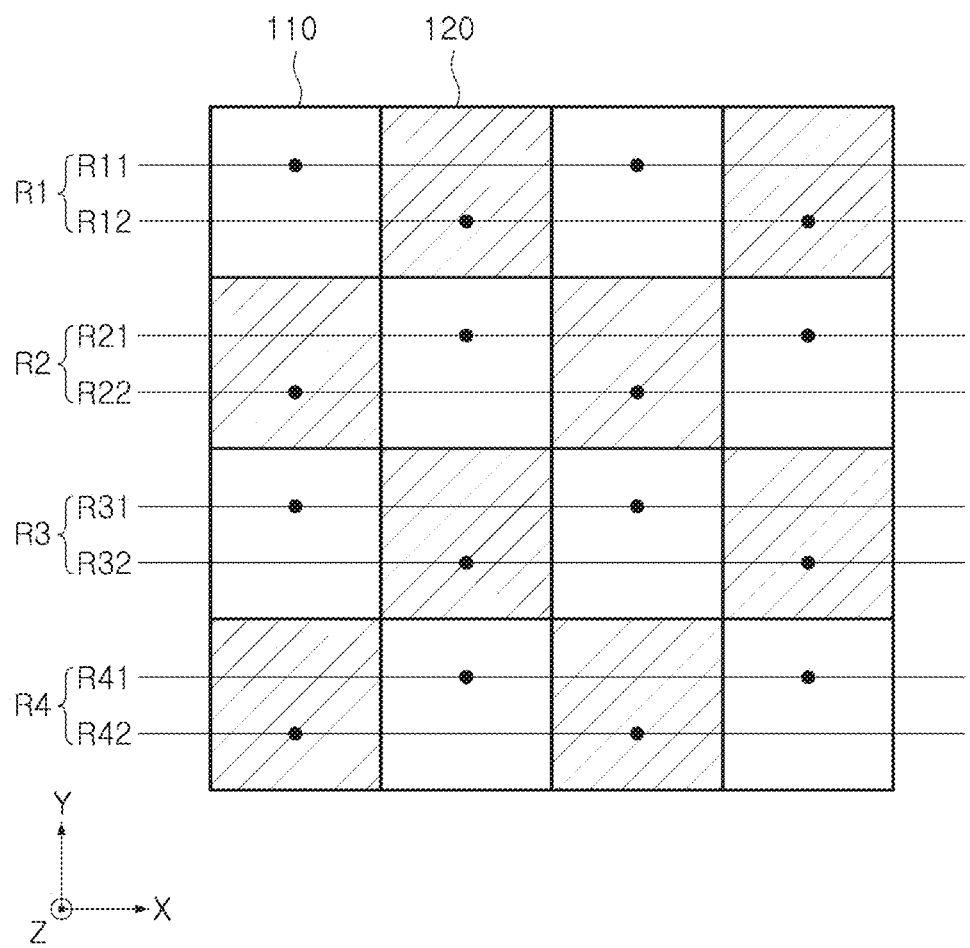
Figure 5:
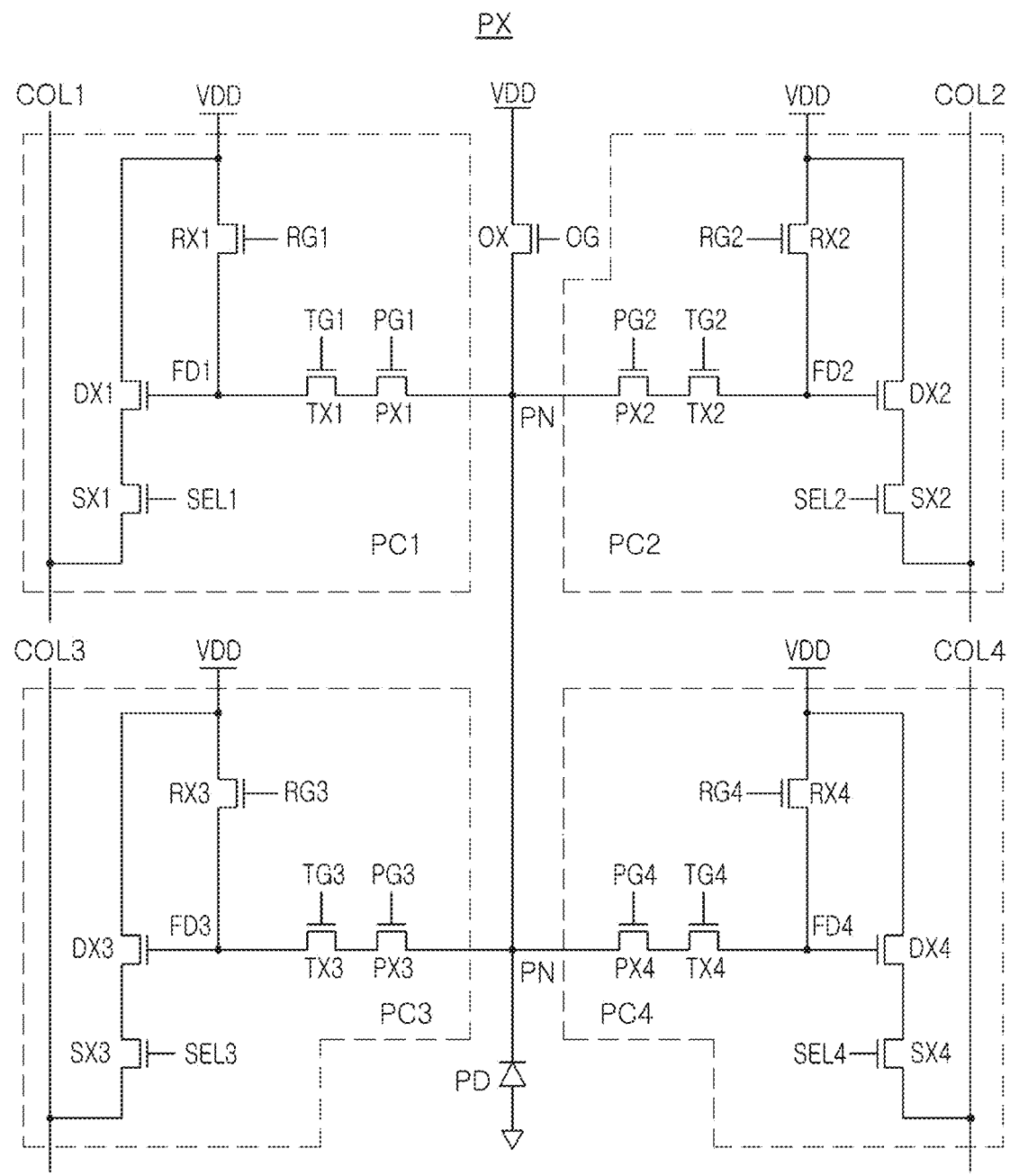
FIG. 5 is a schematic circuit diagram of a pixel of an imaging device according to some example embodiments.
Figure 6:
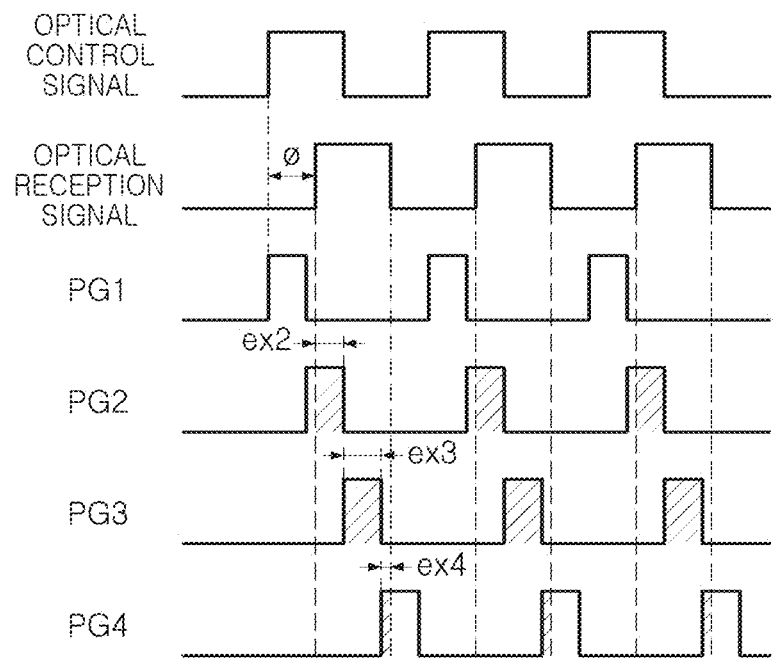
FIG. 6 is a view illustrating the operation of an imaging device according to some example embodiments.

FIGS. 4A and 4B are schematic diagrams illustrating a pixel array included in an imaging device according to some example embodiments. FIG. 5 is a schematic circuit diagram of a pixel of an imaging device according to some example embodiments. FIG. 6 is a view illustrating the operation of an imaging device according to some example embodiments.

First, referring to FIG. 4A, a pixel array 100 according to some example embodiments may include a plurality of pixels 110 and 120 arranged in a first direction (X-axis direction) and a second direction (Y-axis direction). As an example, the pixel array 100 may include first pixels 110 and second pixels 120, and the second pixels 120 may be adjacent to the first pixels 110 in the first direction and the second direction, respectively. In detail, each of the second pixels 120 may not be adjacent to the other second pixels 120 in the first direction and the second direction. For example, the first pixels 110 and the second pixels 120 may be arranged in a checkerboard fashion.

Both the first pixels 110 and the second pixels 120 may have the same structure. However, the first pixels 110 and the second pixels 120 may operate by receiving control signals of different frequencies from a logic circuit of the imaging device. For example, the logic circuit may input first photo control signals of a first frequency to the first pixels 110 and may input second photo control signals of a second frequency lower than the first frequency to the second pixels 120.

The first pixels 110 and the second pixels 120 disposed on the same position in the second direction may be connected to different row lines, such that the first photo control signals are input to the first pixels 110 and the second photo control signals are input to the second pixels 120. Referring to FIG. 4B illustrating an enlarged view of a partial region of the pixel array 100, a first row line R1 includes a first sub-row line R11 and a second sub-row line R12. The first sub-row line R11 may be connected to the first pixels 110, and the second sub-row line R12 may be connected to the second pixels 120. In more detail, the first photo control signals having a first frequency may be input to the first pixels 110 through the first sub-row lines R11-R41, and the second photo control signals having a second frequency may be input to the second pixels 120 through the second sub-row lines R12-R42. Unlike the row lines, the column lines may be shared by the first pixels 110 and the second pixels 120 disposed in the same position in the first direction.

Referring to FIG. 5, a pixel PX of the imaging device according to some example embodiments may include a photodiode PD generating electrical charge in response to an optical signal, and pixel circuits PC1 to PC4 outputting an electrical signal corresponding to a charge generated by the photodiode PD. The pixel circuits PC1-PC4 may include first to fourth pixel circuits PC1-PC4.

The first pixel circuit PC1 may be connected to a first column line COL1, and the second pixel circuit PC2 may be connected to a second column line COL2. The third pixel circuit PC3 may be connected to a third column line COL3, and the fourth pixel circuit PC4 may be connected to a fourth column line COL4. The first to fourth column lines COL1-COL4 may be connected to a sampling circuit obtaining a pixel circuit from the first to fourth pixel circuits PC1-PC4 and an analog-to-digital converter converting the pixel circuit into digital data (not shown).

The first to fourth pixel circuits PC1 to PC4 may have the same structure. For example, the first pixel circuit PC1 may include a first photo transistor PX1 connected to the photodiode PD, a first transfer transistor TX1, a first floating diffusion FD1, e.g. a first floating diffusion node accumulating charge generated by the photodiode PD, and a plurality of first circuit elements RX1, DX1 and SX1. The plurality of first circuit elements RX1, DX1, and SX1 may include first reset transistor RX1, first driving transistor DX1, first selection transistor SX1, and the like. Control signals TG1, RG1, and SEL1 for controlling the first transfer transistor TX1, the first reset transistor RX1, and the first selection transistor SX1 may be input by a clock driver of the imaging device. Although FIG. 5 illustrates each of the transistors as being NMOS transistors, example embodiments are not limited thereto. Furthermore electrical and/or physical characteristics of each of the transistors may be the same or may be different from one another.

When the first reset transistor RX1 is turned on, the voltage of the first floating diffusion FD1 is reset to a power supply voltage VDD, and the selection transistor SX1 is turned on such that a first reset voltage is output to the first column line COL1. During a first exposure time before the first transfer transistor TX1 is turned on after the first reset transistor RX1 is turned off, the photodiode PD may be exposed to light to generate electrical charge.

When the first transfer transistor TX1 is turned on, charges generated in the photodiode PD and accumulated in the first photo transistor PX1 may move to the first floating diffusion FD1. When the first selection transistor SX1 is turned on, a first pixel voltage may be output to the first column line COL1. The first analog-to-digital converter connected to the first column line COL1 may convert a difference between the first reset voltage and the first pixel voltage into first raw data DATA1 which is digital data.

The operation of the second to fourth pixel circuits PC2-PC4 may be similar to that of the first pixel circuit PC1. However, digital control signals/photo control signals PG1 to PG4 input to the first to fourth pixel circuits PC1 to PC4, respectively, may have different phases (or different rising times/falling times). For example, when the pixel PX is one of the first pixels 110 described with reference to FIGS. 4A and 4B, the photo control signals PG1-PG4 have a first frequency and may have a phase difference of one of 0 degrees, 90 degrees, 180 degrees, and 270 degrees based on the optical control signal. On the other hand, when the pixel PX is one of the second pixels 120 described with reference to FIGS. 4A and 4B, the photo control signals PG1-PG4 have a second frequency and may have a phase difference of 0 degrees, 90 degrees, 180 degrees, and 270 degrees based on the optical control signal. Hereinafter, the operation of the imaging device will be described in more detail with reference to FIG. 6.

Referring to FIG. 6, the photo control signals PG1 to PG4 input to the pixel PX may have a phase difference of 0 degrees, 90 degrees, 180 degrees, and 270 degrees based on the optical control signal. In addition, the duty ratio of each of the photo control signals PG1 to PG4 may be 1/2 of the duty ratio of the photo control signal. The optical control signal input to the light source of the imaging device and the light reception signal reflected from the subject and input to the pixel array of the imaging device may have a specific (or, alternatively, predetermined) phase difference (φ). The phase difference y may be determined according to the raw data determined according to the overlapping times ex2-ex4 of the photo control signals PG1-PG4 and the optical reception signal. For example, the phase difference y is determined as in Equation 2, and in Equation 2, A1 to A4 may be or correspond to raw data output by the first to fourth pixel circuits PC1 to PC4. Additionally information on the distance to the subject according to the phase difference y may be determined as illustrated in Equation 3.

$$\varphi = \arctan\frac{A2 - A4}{A1 - A3} \qquad \text{[Equation 2]}$$

$$d = \frac{c}{2f_m}\frac{\varphi}{2\pi} \qquad \text{[Equation 3]}$$

Figure 7:
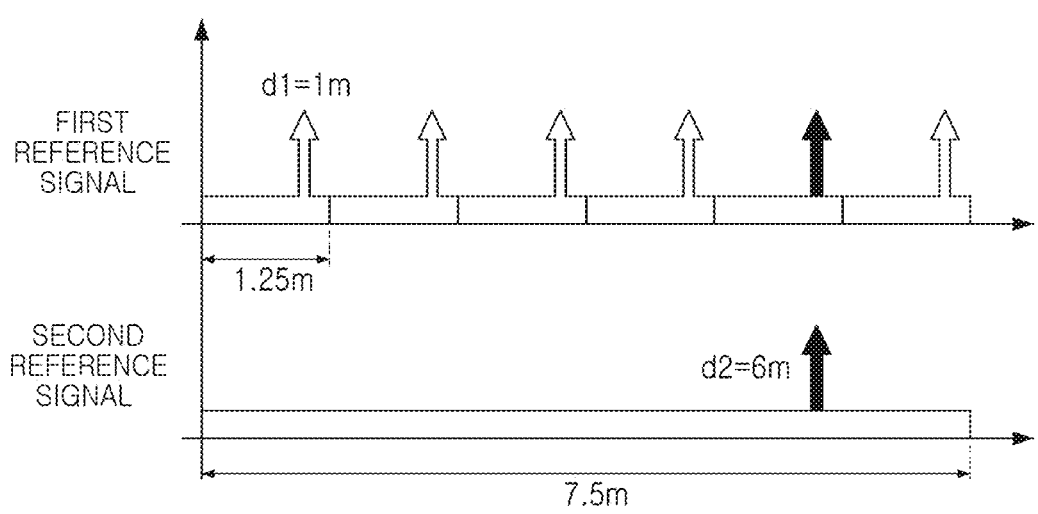
FIGS. 7 to 9 are views illustrating the operation of a light source included in an imaging device according to some example embodiments.
Figure 8:
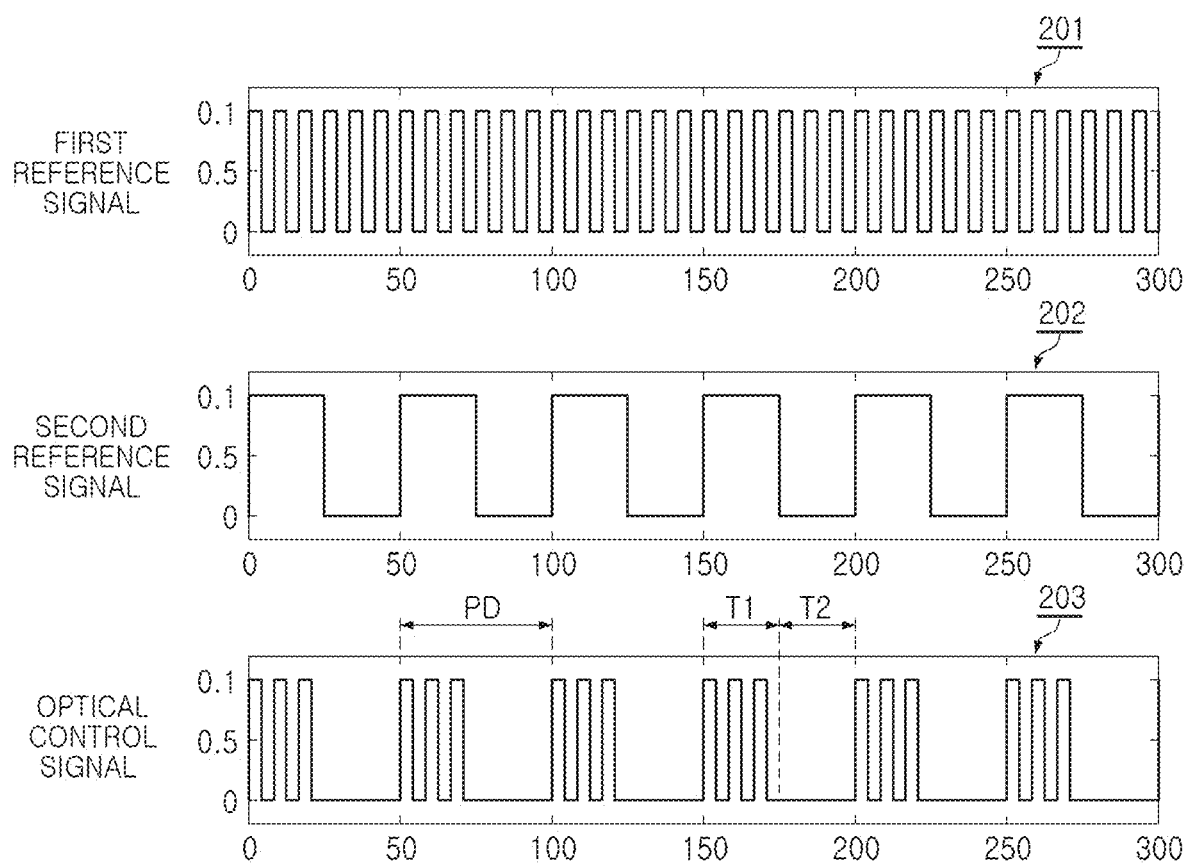
Figure 9:
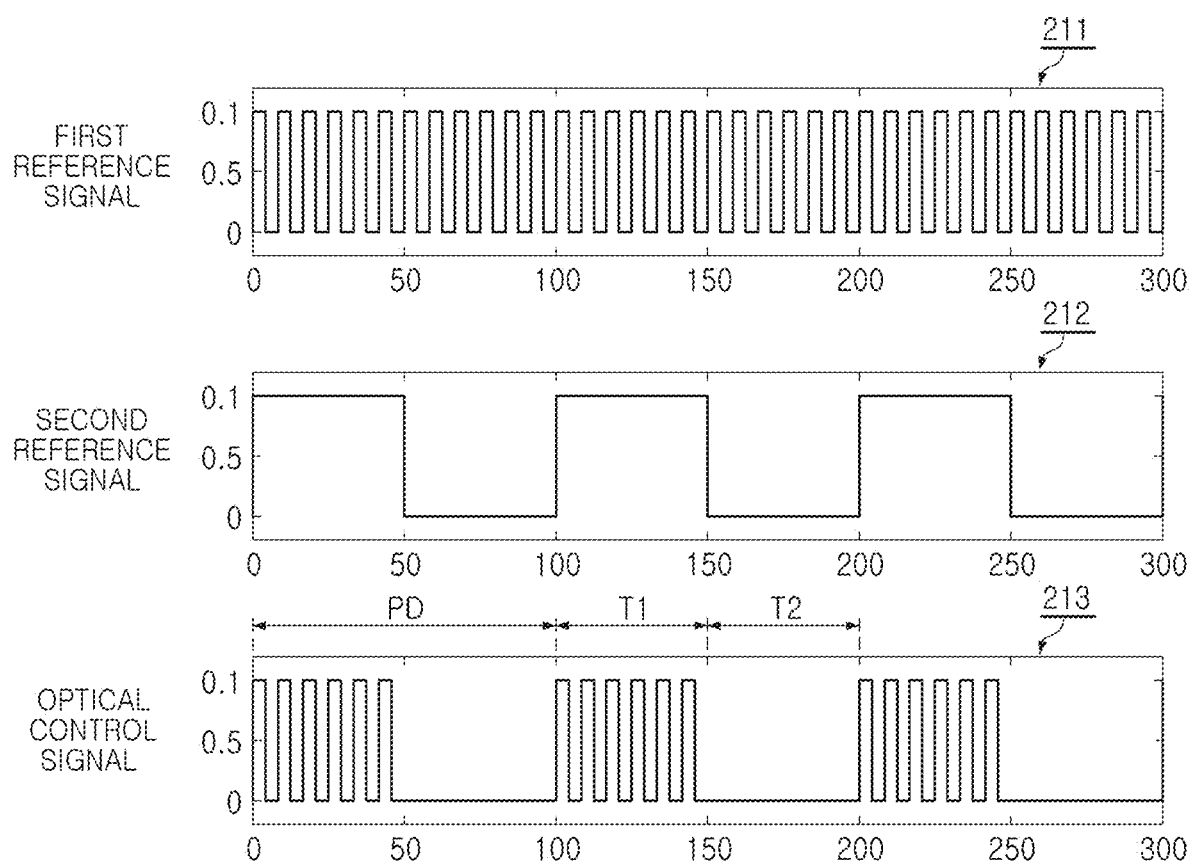

FIGS. 7 to 9 are views illustrating the operation of a light source included in an imaging device according to some example embodiments.

FIG. 7 is a drawing illustrating a method of increasing a maximum distance measurable with an imaging device by driving a light source with an optical control signal generated using a first reference signal of a first frequency and a second reference signal of a second frequency. In some example embodiments such as those illustrated in FIG. 7, a first frequency is 120 MHz and a second frequency is 20 MHz. However, the first frequency and the second frequency may be variously modified depending on some example embodiments. For example, the first frequency may be greater than the second frequency, and may be an integer multiple or a half-integer multiple of the second frequency.

In some example embodiments, a light source is driven by an optical control signal generated using a first reference signal and a second reference signal, and the first pixels are driven by the first photo control signals of a first frequency, and the second pixels are driven by the second photo control signals of a second frequency, thereby increasing a maximum distance that the imaging device may measure. Referring to Equation 1 described above, the maximum distance that may be measured using the raw data obtained from the first pixels may be 1.25 m, and the maximum distance that may be measured using the raw data obtained from the second pixels may be larger, e.g. may be 7.5 m.

For example, in a case in which the distance measured using the raw data acquired from the first pixels is 1 m, an actual distance of the imaging device to the subject may be one of 2.25 m, 3.5 m, 4.75 m and 6 m, instead of 1 m. In detail, cases in which the distance between the imaging device and the subject is 1 m and 6 m may not be distinguished from each other by only the raw data obtained from the first pixels. For example there may be an aliasing phenomenon in such cases.

In some example embodiments of inventive concepts, the above problem may be prevented or reduced in likelihood of occurrence by driving a light source with an optical control signal generated using the first reference signal and the second reference signal. For example, the optical control signal may be generated by multiplying the first reference signal and the second reference signal. For example, in some example embodiments of inventive concepts, the maximum distance that may be measured by the imaging device may be extended by a minimum (least) common multiple of a maximum distance measurable when driving the light source with the first reference signal and a maximum distance measurable when driving the light source with the second reference signal. In some example embodiments as illustrated in FIG. 7, the maximum distance that the imaging device may measure may be 15 m.

When the distance measured using the raw data obtained from the first pixels is d1 and the distance measured using the raw data obtained from the second pixels is d2, an actual distance d between the imaging device and the subject may be determined according to Equation 4 below. In Equation 4, N1 and N2 are each integers greater than or equal to 0, $d1_{MAX}$ is a maximum distance that may be measured using raw data obtained from the first pixels, and $d2_{MAX}$ may be a maximum distance that may be measured using raw data obtained from the second pixels.

$$d=d1+N1*d1_{MAX}=d2+N2*d2_{MAX}$$ [Equation 4]

For example, when the distance measured using the raw data obtained from the first pixels is 1 m and the distance measured using the raw data obtained from the second pixels is 6 m, the actual distance d may be determined as 6 m. On the other hand, when the distance measured using the raw data obtained from the first pixels is 1 m and the distance measured using the raw data obtained from the second pixels is 7.25 m, the actual distance d may be determined to be 14.75 m.

FIGS. 8 and 9 are diagrams illustrating a method of generating an optical control signal. First, in some example embodiments illustrated in FIG. 8, the frequency of a first reference signal 201 may be 120 MHz, and the frequency of a second reference signal 202 may be 20 MHz. An optical control signal 203 may be generated as a result of multiplying the first reference signal 201 and the second reference signal 202. One period PT of the optical control signal 203 may be the same as one period of the second reference signal 202, and thus, the frequency of the optical control signal 203 may be 20 MHz equal to the second frequency.

One period PT of the optical control signal 203 may include a first period T1 and a second period T2, and the first period T1 and the second period T2 may be the same amount of time. The light source may be repeatedly turned on and off by the optical control signal 203 during the first period T1, and the light source may be maintained in the turned off state by the optical control signal 203 during the second period T2. The number of times the light source repeats the turn-on and turn-off during the first period T1 may be determined according to a ratio of the first frequency and the second frequency. As an example, in some example embodiment as illustrated in FIG. 8, the first frequency may be 6 times the second frequency, and thus, the light source may repeat turn-on and turn-off three times during the first period T1.

Next, in some example embodiments illustrated in FIG. 9, the frequency of a first reference signal 211 may be 120 MHz, and the frequency of a second reference signal 212 may be 10 MHz. In the example embodiment illustrated in FIG. 9, the frequency of the optical control signal 213 may be 10 MHz, and since the first frequency is 12 times the second frequency, the light source may repeat turn-on and turn-off six times during the first period T1.

In some example embodiments, while the light source is driven by the optical control signals 203 and 213, the first pixels of the pixel array may receive first photo control signals having a first frequency, and the second pixels may receive second photo control signals having a second frequency. Therefore, using information of the distance to the subject calculated using the raw data obtained from the first pixels and information of the distance to the subject calculated using the raw data obtained from the second pixels, the distance between the imaging device and the subject may be more accurately calculated, and/or the accuracy of the depth image may be improved. Alternatively or additionally, since the optical control signals 203 and 213 are input to the light source and a depth image is generated from raw data acquired from the first pixels and the second pixels during one frame period, the measurable distance may be increased without decreasing or with only a small decrease in the frame rate.

Figure 10:
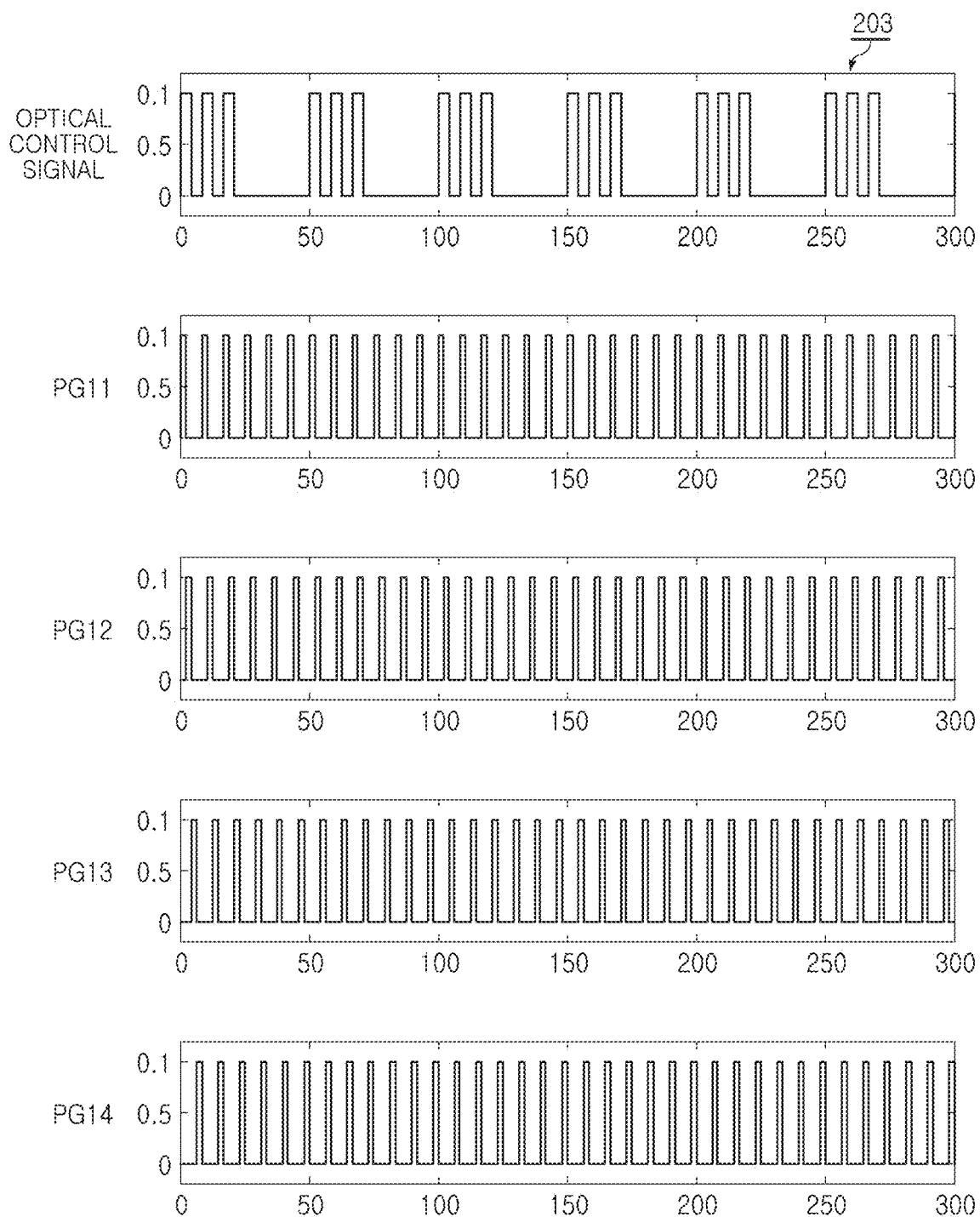
FIGS. 10 and 11 are views illustrating the operation of an imaging device according to some example embodiments.
Figure 11:
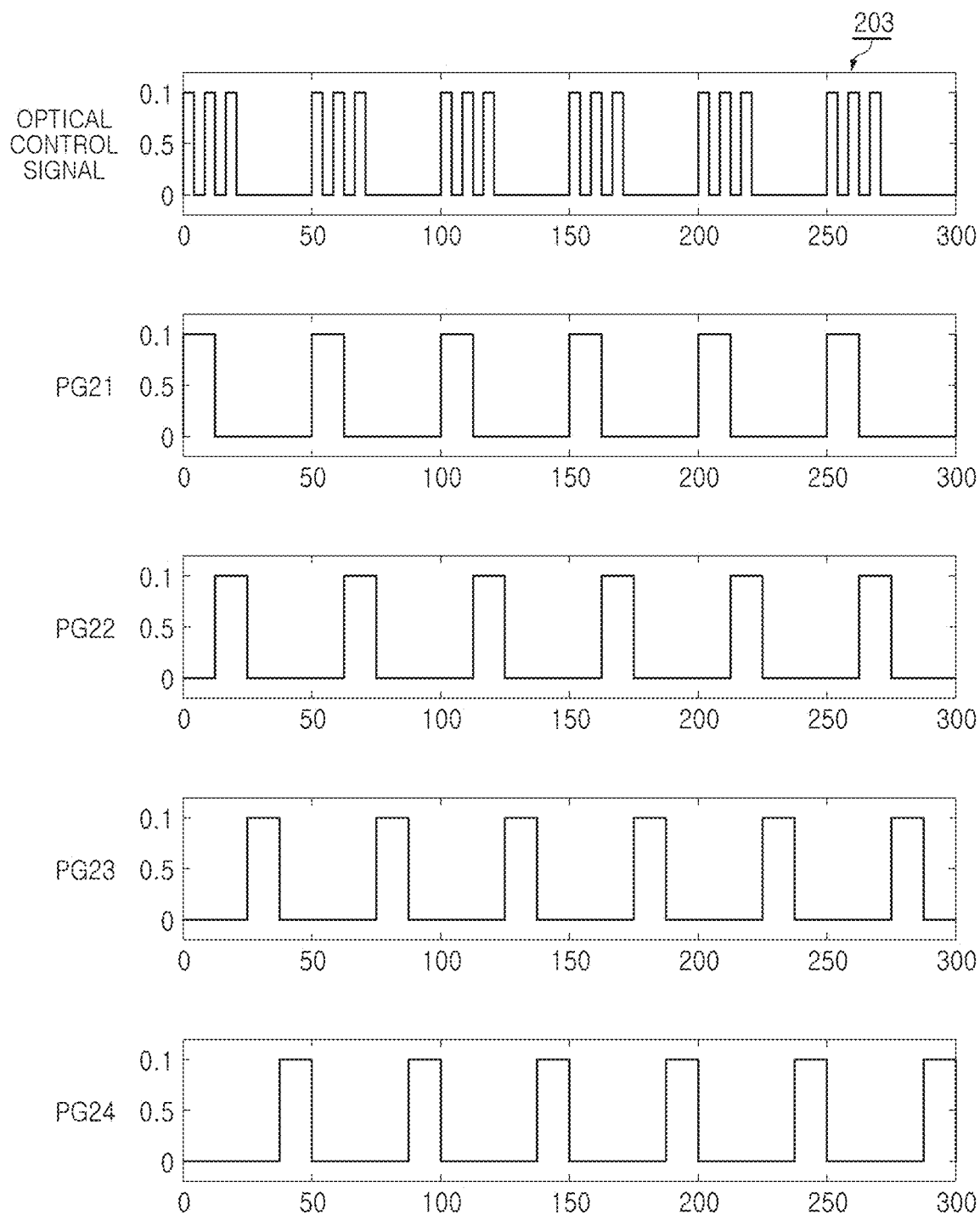

FIGS. 10 and 11 are views illustrating the operation of an imaging device according to some example embodiments.

In some example embodiments for example as described with reference to FIGS. 10 and 11, the optical control signal 203 may be generated using the first reference signal 201 of the first frequency and the second reference signal 202 of the second frequency as in some example embodiments described with reference to FIG. 8. FIG. 10 may be a diagram illustrating first photo control signals PG11-PG14 input to each of the first pixels, while a light source is driven by the optical control signal 203, and FIG. 11 may be a drawing illustrating second photo control signals PG21 to PG24 input to each of the second pixels. The first pixels and the second pixels may have the same structure.

First, referring to FIG. 10, the optical control signal 203 may be a signal having a frequency of 20 MHz, and the light source may be turned on and off during the first period T1 of one period PT, and the light source may be turned off during the second period T2. The first photo control signals PG11 to PG14 may be signals corresponding to photo transistors of pixel circuits included in each of the first pixels. In some example embodiments for example as described with reference to FIG. 10, each of the first pixels may include first to fourth pixel circuits as described with reference to FIG. 5.

The first photo control signals PG11 to PG14 may be input to photo transistors of the first to fourth pixel circuits, respectively. The first photo control signals PG11-PG14 may have a first frequency, and each first photo control signals PG11-PG14 may have a phase difference of one of 0 degrees, 90 degrees, 180 degrees, and 270 degrees, based on the first reference signal 201 used to generate the optical control signal 203 as described above with reference to FIG. 8. Also, the first photo control signals PG11 to PG14 may have a duty ratio of 1/2 compared to the first reference signal 201. In some example embodiments, the first photo control signals PG11 to PG14 may be generated by reducing a duty ratio of the first reference signal 201 and shifting a phase.

Next, referring to FIG. 11, second photo control signals PG21 to PG24 may be input to photo transistors of the first to fourth pixel circuits included in the second pixels. The second photo control signals PG21 to PG24 may have a second frequency, and each of the second photo control signals PG21 to PG25 may have a phase difference of one of 0 degrees, 90 degrees, 180 degrees, and 270 degrees based on the second reference signal 202. In addition, the second photo control signals PG21 to PG24 may have a duty ratio of 1/2 compared to the second reference signal 202.

The logic circuit of the imaging device may calculate first distance information to the subject using the raw data obtained from the first pixels, and may calculate second distance information to the subject using the raw data obtained from the second pixels. Despite the distance information for a same subject, since photo control signals input to the first pixels and the second pixels are different from each other, the first distance information and the second distance information may be different. The logic circuit may calculate more accurate distance information to the subject by combining the first distance information and the second distance information according to the method described above with reference to Equation 4, and may generate a depth image therefrom.

Figure 12:
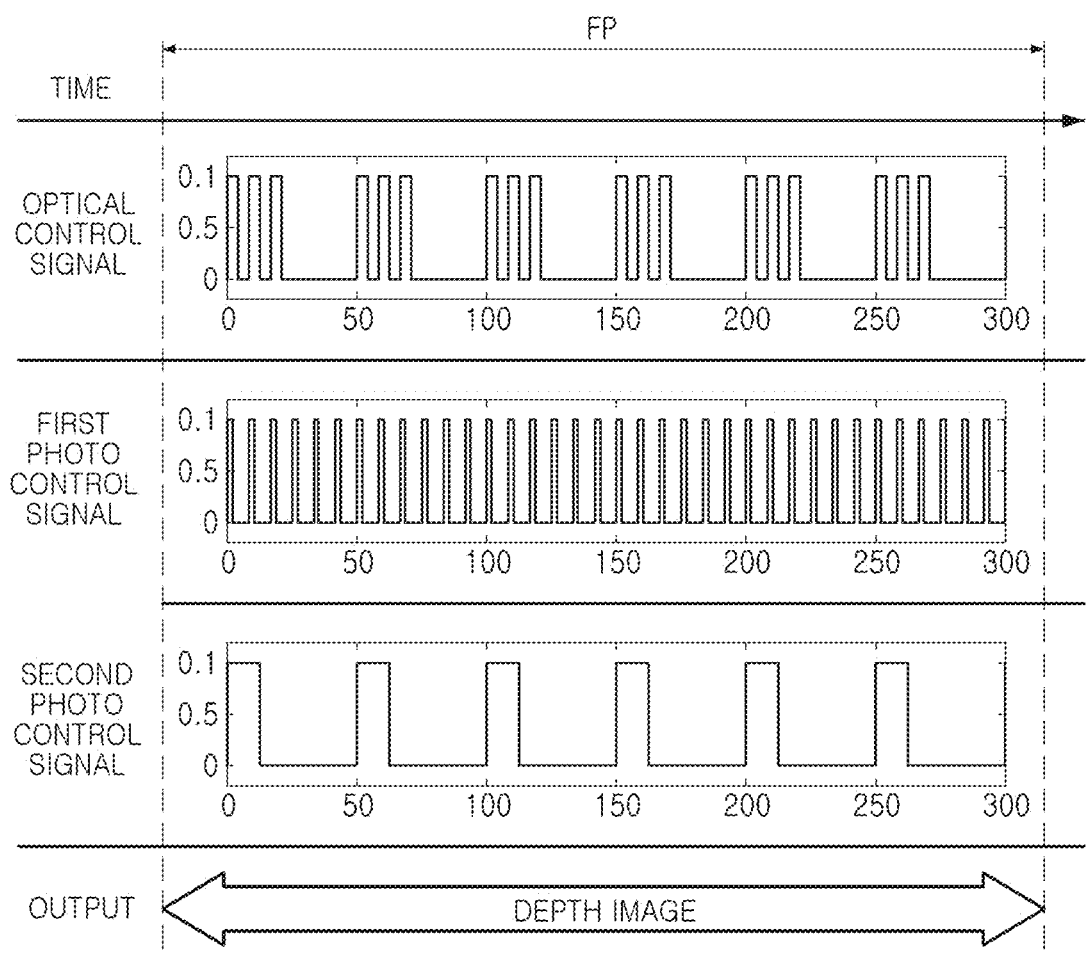
FIGS. 12 and 13 are views illustrating the operation of an imaging device according to some example embodiments.
Figure 13:
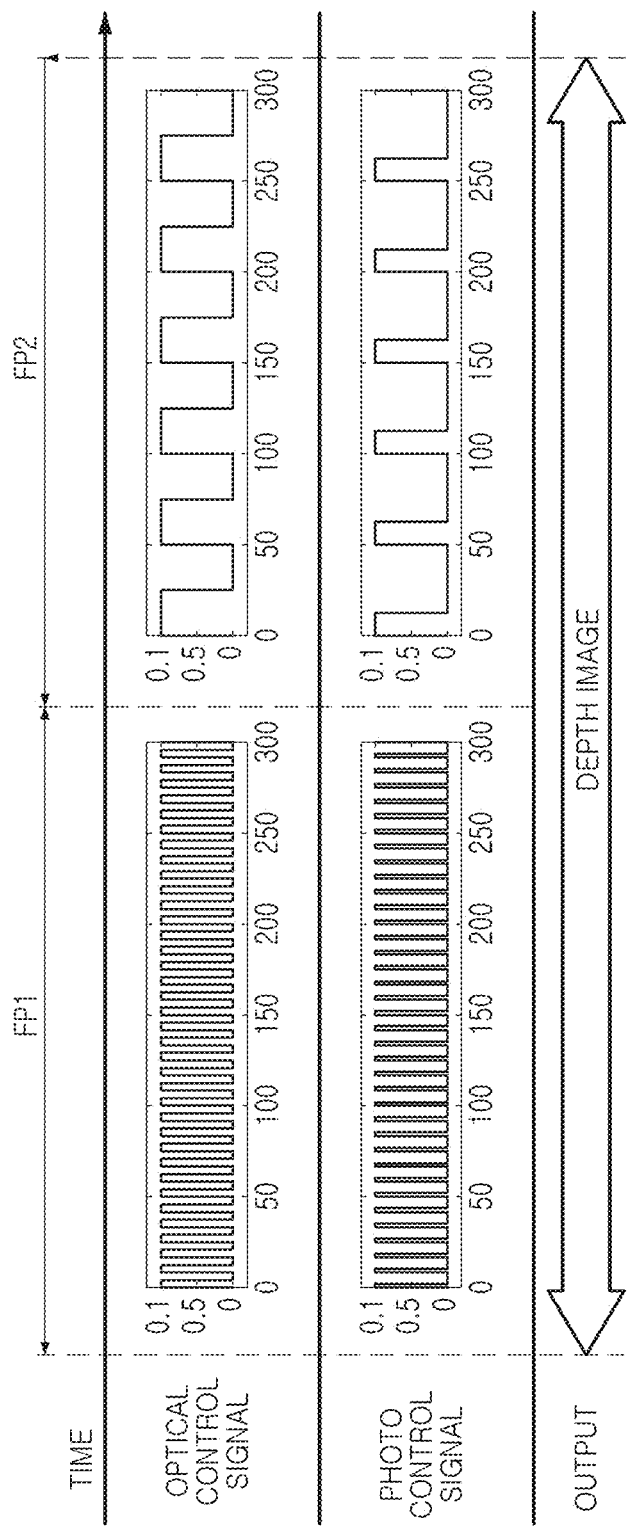

FIGS. 12 and 13 are views illustrating the operation of an imaging device according to some example embodiments.

First, referring to FIG. 12, an imaging device according to some example embodiments may operate according to a specific (or, alternatively, predetermined) frame rate. The frame rate may be determined according to a frame period FP, which is a time required for the imaging device to output one depth image. During the frame period FP, the light source is driven by the optical control signal, and the optical control signal may be a signal generated using reference signals having different frequencies. For example, the optical control signal may be generated by multiplying a first reference signal of a first frequency and a second reference signal of a second frequency.

The first photo control signal is or includes a signal input to first pixels of a pixel array included in the imaging device, and may have a first frequency. For example, each of the first pixels may include first to fourth pixel circuits, and a first photo control signal illustrated in FIG. 12 may be input to the first pixel circuit. Signals in which the phase of the first photo control signal is shifted by 90 degrees, 180 degrees, and 270 degrees may be input to the second to fourth pixel circuits.

The second photo control signal is or includes a signal input to second pixels of a pixel array included in the imaging device and may have a second frequency. Like the first pixels, each of the second pixels may include first to fourth pixel circuits, and the second photo control signal illustrated in FIG. 12 may be input to the first pixel circuit. Signals in which the phase of the second photo control signal is shifted by 90 degrees, 180 degrees, and 270 degrees may be input to the second to fourth pixel circuits.

As described above, a large, e.g. the maximum distance to the subject that may be measured by the imaging device may be determined according to the frequency of the optical control signal input to the light source. In some example embodiments, as illustrated in FIG. 12, the maximum distance that the imaging device may measure may be increased within only one frame period (FP).

Meanwhile, since a first photo control signal of a first frequency is input to the first pixels and a second photo control signal of a second frequency is input to the second pixels, there may be a difference in noise characteristics between the first raw data acquired from the first pixels and the second raw data acquired from the second pixels, which may affect the quality of the depth image. In some example embodiments of the present inventive concept, the above problem may be prevented or reduced in likelihood of occurrence by modifying the second raw data by using the first raw data.

First, the logic circuit of the imaging device may calculate more accurate distance information to the subject using first raw data obtained from first pixels and second raw data obtained from second pixels. When the distance information to the subject is calculated, the image processor of the imaging device may modify the second raw data by using the first raw data and generate a depth image. For example, the image processor may modify second raw data of each of the second pixels by using first raw data obtained from two or more first neighboring pixels adjacent to each of the second pixels. In some example embodiments, the image processor may replace the second raw data of each of the second pixels with an arithmetic average such as one or more measures of central tendency, such as one or more of the mean, the median, or the mode, of the first raw data obtained from first neighboring pixels. By modifying the second raw data using the first raw data as described above, a difference in noise characteristics between pixels may be significantly reduced, and the quality of a depth image output by the imaging device may be improved.

FIG. 13 may be a view illustrating a comparative example to illustrate the operation of an imaging device according to some example embodiments. Referring to FIG. 13, in the comparative example, a light source may be driven by optical control signals of different frequencies in consecutive first frame period FP1 and second frame period FP2.

For example, in the first frame period FP1, the light source may be driven by an optical control signal of a first frequency, and in the second frame period FP2, the light source may be driven by an optical control signal of a second frequency lower than the first frequency. Depending on the frequency of the optical control signal, the frequency of the photo control signal input to the pixels in the first frame period FP1 and the second frame period FP2 may also vary. A photo control signal having a first frequency may be input to the pixels in the first frame period FP1, and a photo control signal having a second frequency may be input to the pixels in the second frame period FP2.

The imaging device according to comparative examples acquires distance information to a subject using raw data acquired from pixels in the first frame period FP1 and raw data acquired from pixels in the second frame period FP2, and may generate a depth image. Accordingly, two frame periods FP1 and FP2 are required to generate one depth image, and as a result, the frame rate of the imaging device may decrease, resulting in a deterioration in operation performance.

Meanwhile, in the case of the imaging device according to some example embodiments of inventive concepts, as described with reference to FIG. 12, a depth image indicating accurate distance information may only be generated with raw data acquired in one frame period FP. Alternatively or additionally, to reduce a difference in noise characteristics of raw data acquired from the first pixels and the second pixels operating with photo control signals of different frequencies, the second raw data obtained from the second pixels may be corrected by referring to the first raw data obtained from the first pixels. Accordingly, an imaging device by which an accurate depth image having excellent noise characteristics may be output without reducing the frame rate may be implemented. Since the depth image is mainly generated based on the first raw data of the first pixels receiving the photo control signal having a relatively great first frequency, the resolution of the depth image may also be sufficiently secured.

In some example embodiments, as the number of second pixels included in the imaging device increases, the amount of second raw data to be modified with reference to the first raw data increases. Thus, the second pixels may be disposed or arranged in a smaller number than that of the first pixels, in a pixel array, which will be hereinafter described with reference to FIGS. 14 and 15.

Figure 14:
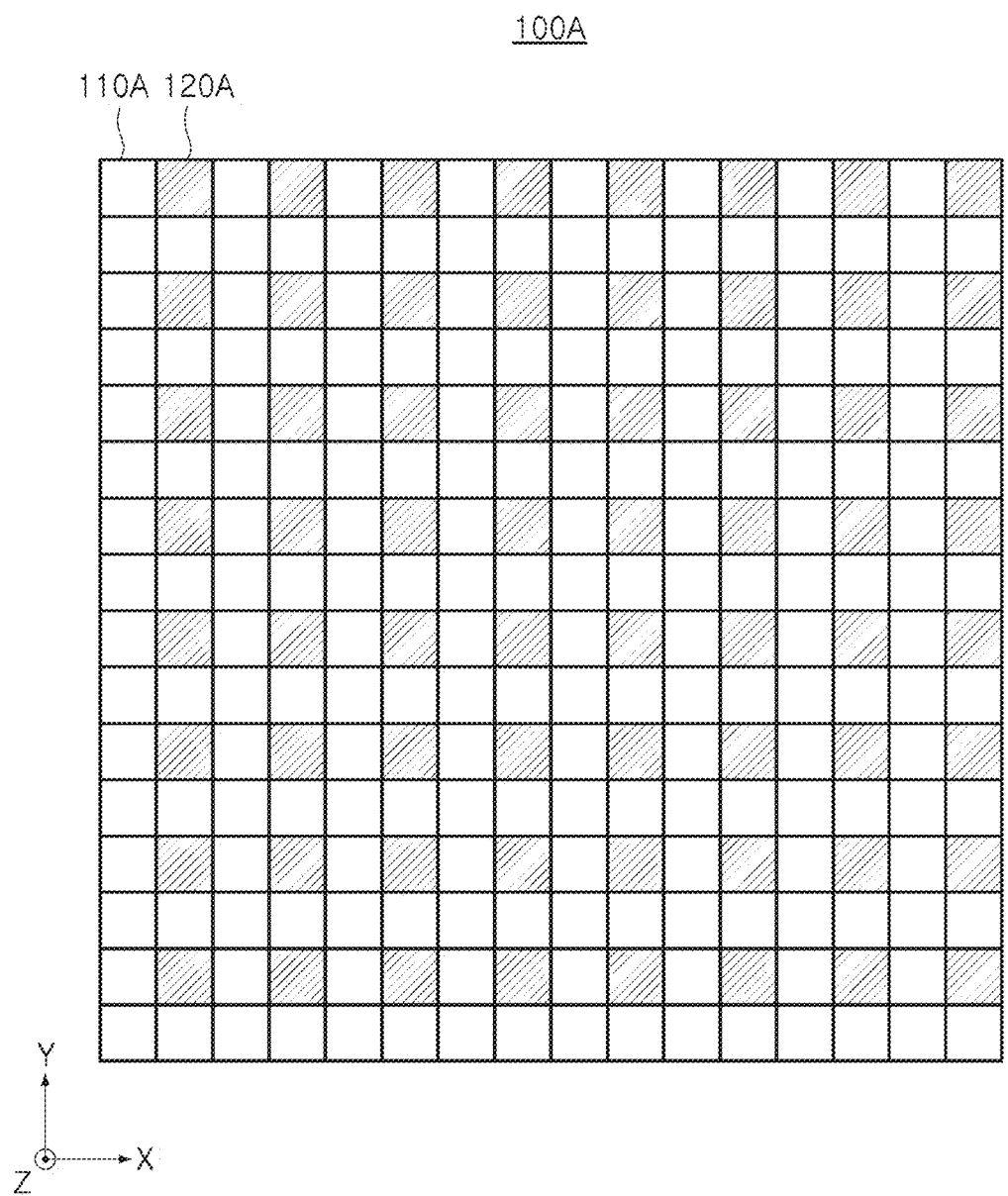
FIGS. 14 and 15 are diagrams schematically illustrating a pixel array included in an imaging device according to some example embodiments.
Figure 15:
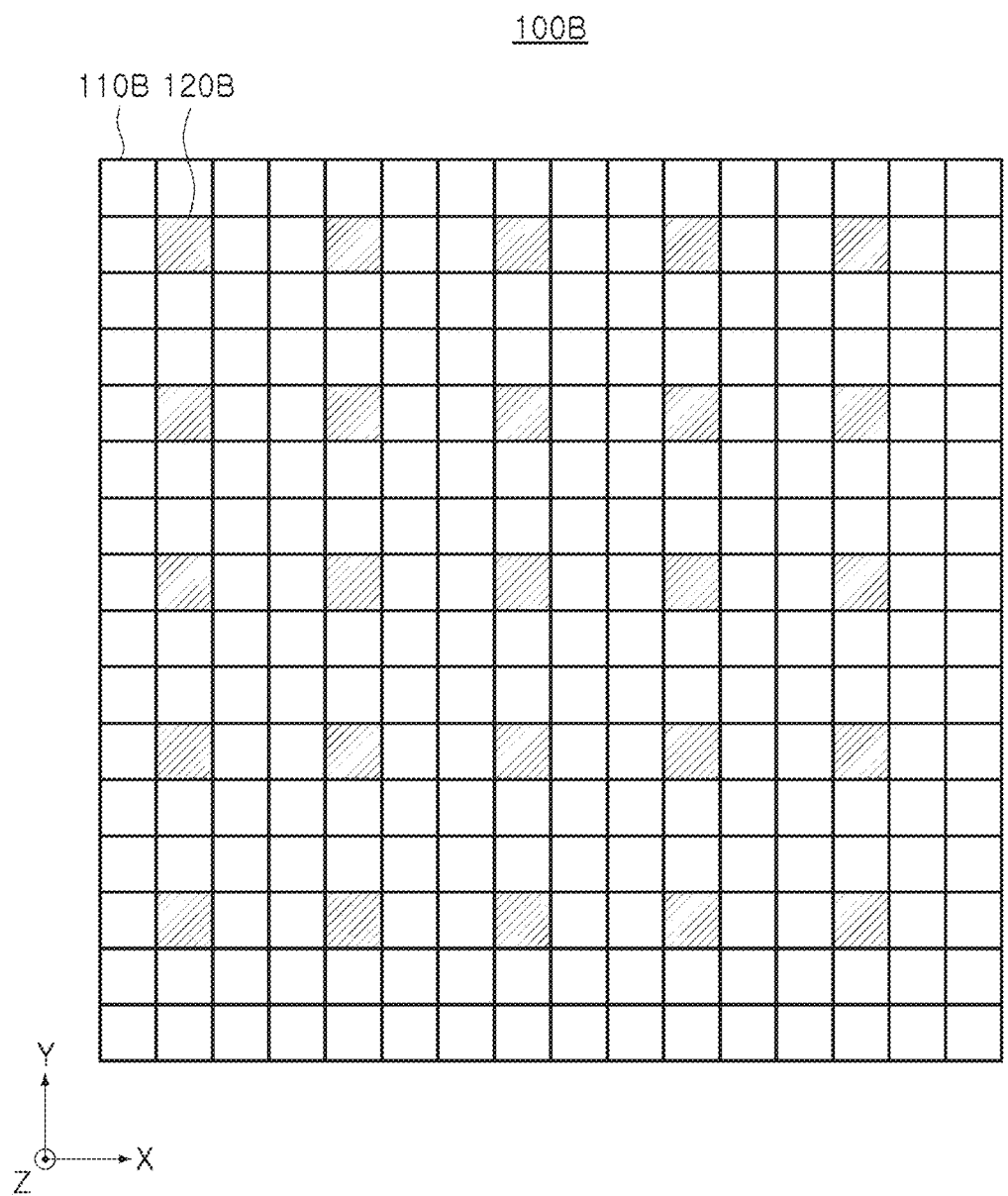

FIGS. 14 and 15 are diagrams schematically illustrating a pixel array included in an imaging device according to some example embodiments.

First, referring to FIG. 14, a pixel array 100A according to some example embodiments may include a plurality of pixels 110A and 120A arranged in a first direction (X-axis direction) and a second direction (Y-axis direction). For example, the pixel array 100 may include first pixels 110A and second pixels 120A. Similar to example embodiments described above with reference to FIGS. 4A and 4B, the second pixels 120A may respectively be adjacent to the first pixels 110A in the first direction and the second direction, and both the first pixels 110A and the second pixels 120A may have the same structure. For example, each of the first pixels 110A and the second pixels 120A may include a plurality of pixel circuits PC1 to PC4 as described with reference to FIG. 5.

The first pixels 110A and the second pixels 120A may operate by receiving photo control signals having different frequencies from a logic circuit of the imaging device. For example, the logic circuit may input first photo control signals of a first frequency to the first pixels 110A, and may input second photo control signals of a second frequency lower than the first frequency to the second pixels 120A. The first photo control signals and the second photo control signals may be input to the photo transistors of the pixels 110A and 120A.

The first raw data obtained from the first pixels 110A to which a photo control signal of a relatively large frequency may have a relatively excellent spatial resolution, compared to the second raw data obtained from the second pixels 120A to which a photo control signal of a relatively small frequency is input. Accordingly, by configuring the pixel array 110A such that the number of the second pixels 120A is less than the number of the first pixels 110A, the spatial resolution of the depth image generated by the imaging device may be increased. As an example, the number of first pixels 110A may be an integer multiple of or close to an integer multiple of the number of second pixels 120A, and in example embodiments illustrated in FIG. 14, the number of first pixels 110A may be three times the number of the second pixels 120A. In some example embodiments illustrated in FIG. 15, the pixel array 100B may be configured such that the number of first pixels 110B is 8 times the number of second pixels 120B.

Figure 16:
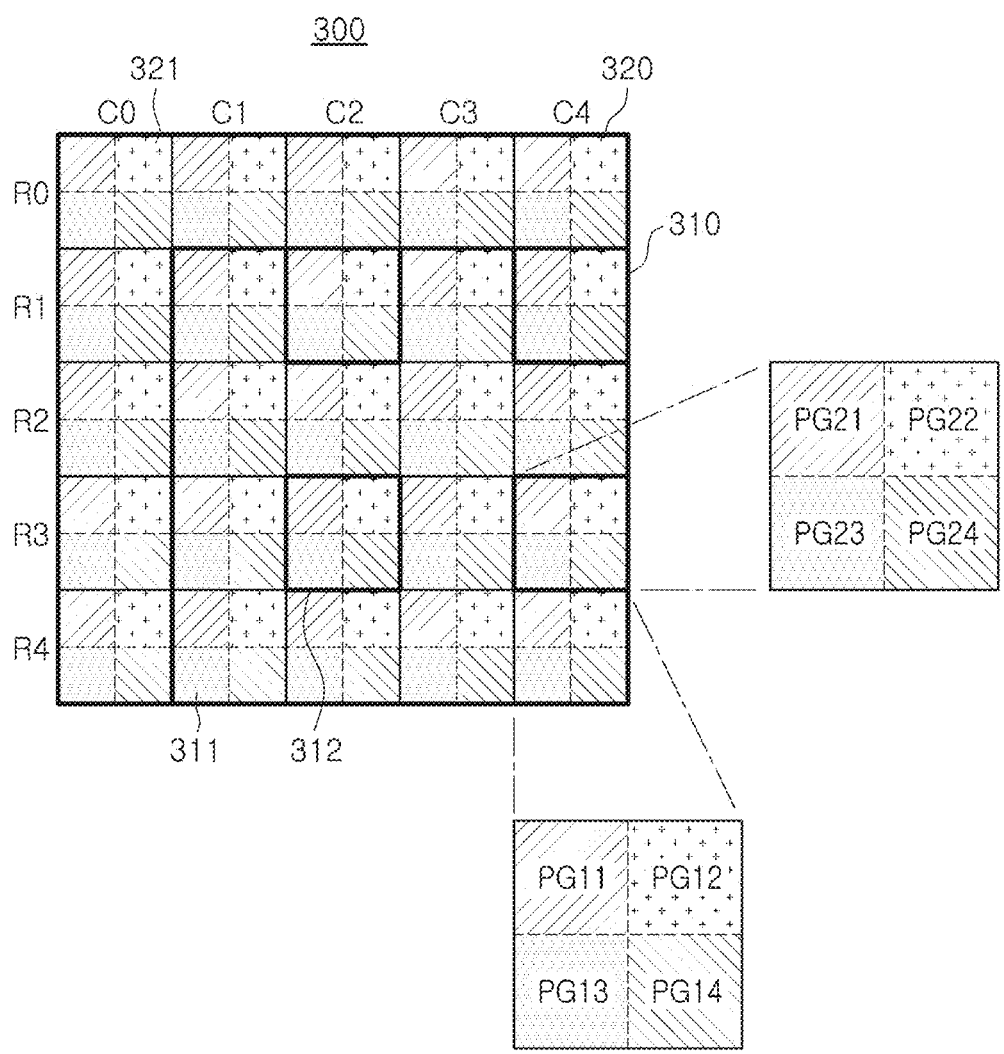
FIG. 16 is a diagram illustrating an operation of an imaging device according to some example embodiments.

FIG. 16 is a diagram illustrating an operation of an imaging device according to some example embodiments.

Referring to FIG. 16, a pixel array 300 of an imaging device according to some example embodiments may include an active area 310 and a dummy area 320. A plurality of pixels 311 and 312 may be disposed in the active area 310, and a plurality of dummy pixels 321 may be disposed in the dummy area 320. The pixels 311 and 312 and the dummy pixels 321 may be arranged in a first direction (X-axis direction) and a second direction (Y-axis direction).

First pixels 311 and second pixels 312 are disposed in the active area 310, and the first pixels 311 and the second pixels 312 may respectively have a structure including first to fourth pixel circuits sharing a single photodiode, and may operate by receiving different photo control signals. As an example, first photo control signals PG11-PG14 of a first frequency may be input to the first to fourth pixel circuits of each of the first pixels 311, and second photo control signals PG21 to PG24 having a second frequency less than the first frequency may be input to the first to fourth pixel circuits of each of the second pixels 312.

Each of the row lines R1 to R4 may include a plurality of lines, such that the first photo control signals PG11-PG14 of a first frequency are input to the first pixels 311, and the second photo control signals PG21-PG24 of a second frequency are input to the second pixels 312. For example, the first row line R1 may include first photo control lines connected to the first pixels 311 to transmit the first photo control signals PG11 to PG14, and second photo control lines connected to the second pixels 312 to transmit the second photo control signals PG21 to PG24.

In the pixel array 300 according to some example embodiments as illustrated in FIG. 16, the number of first pixels 311 may be three times the number of second pixels 312. The logic circuit of the imaging device drives the light source by using the optical control signal generated by multiplying the first reference signal of the first frequency and the second reference signal of the second frequency, and simultaneously, may obtain first raw data from the first pixels 311 and second raw data from the second pixels 312. The logic circuit may calculate distance information of the subject by using the first raw data and the second raw data.

When the distance information is calculated, the image processor of the imaging device may modify the second raw data by using first raw data of first neighboring pixels adjacent to each of the second pixels 312. For example, the second raw data obtained from the second pixel 312 connected to a third row line R3 and a second column line C2 may be modified, based on first raw data of first neighboring pixels connected to the third row line R3 and the first and third column lines C1 and C3, and first raw data of first neighboring pixels connected to the second column line C2 and second and fourth row lines R2 and R4. In some example embodiments, the second raw data may be replaced by an arithmetic average of the first raw data of the first neighboring pixels. However, depending on example embodiments, the second raw data may additionally or alternatively be modified using the first raw data in various manners other than the arithmetic average.

For example, the image processor may modify the second raw data by matching/aligning phases of first photo control signals PG11-PG14 input to each of the first neighboring pixels and second photo control signals PG21-PG24 input to each of the second pixels 312 to each other. The photo control signals PG11-PG14 and PG21-PG24 of different phases are input to the first to fourth pixel circuits, and the image processor may modify the second raw data acquired from the first to fourth pixel circuits included in each of the second pixels 312, based on the first raw data acquired from the first to fourth pixel circuits included in each of the first neighboring pixels.

In some example embodiments, the second raw data obtained from the first pixel circuit of each of the second pixels 312 may be modified based on the first raw data obtained from the first pixel circuit of each of the first neighboring pixels. Alternatively or additionally, the second raw data obtained from the second pixel circuit of each of the second pixels 312 may be modified based on the first raw data obtained from the second pixel circuit of each of the first neighboring pixels. The image processor may generate a depth image representing the subject by using the modified second raw data and the first raw data.

In some example embodiments as illustrated in FIG. 16, the second pixels 312 connected to the first row line R1 may not be adjacent to the first pixels 311 in the second direction. Accordingly, the first raw data for modifying the second raw data acquired from the second pixels 312 connected to the first row line R1 may be insufficient, compared to the second pixels 312 connected to the other row lines R2-R4.

In some example embodiments of inventive concepts, raw data obtained from the dummy pixels 321 disposed in the dummy area 320 may be used to modify the second raw data of at least one of the second pixels 312. For example, to modify the second raw data of the second pixels 312 connected to the first row line R1 and the second column line C2, raw data output by the dummy pixel 321 connected to a dummy row line R0 and the second column line C2 may be used.

Figure 17:
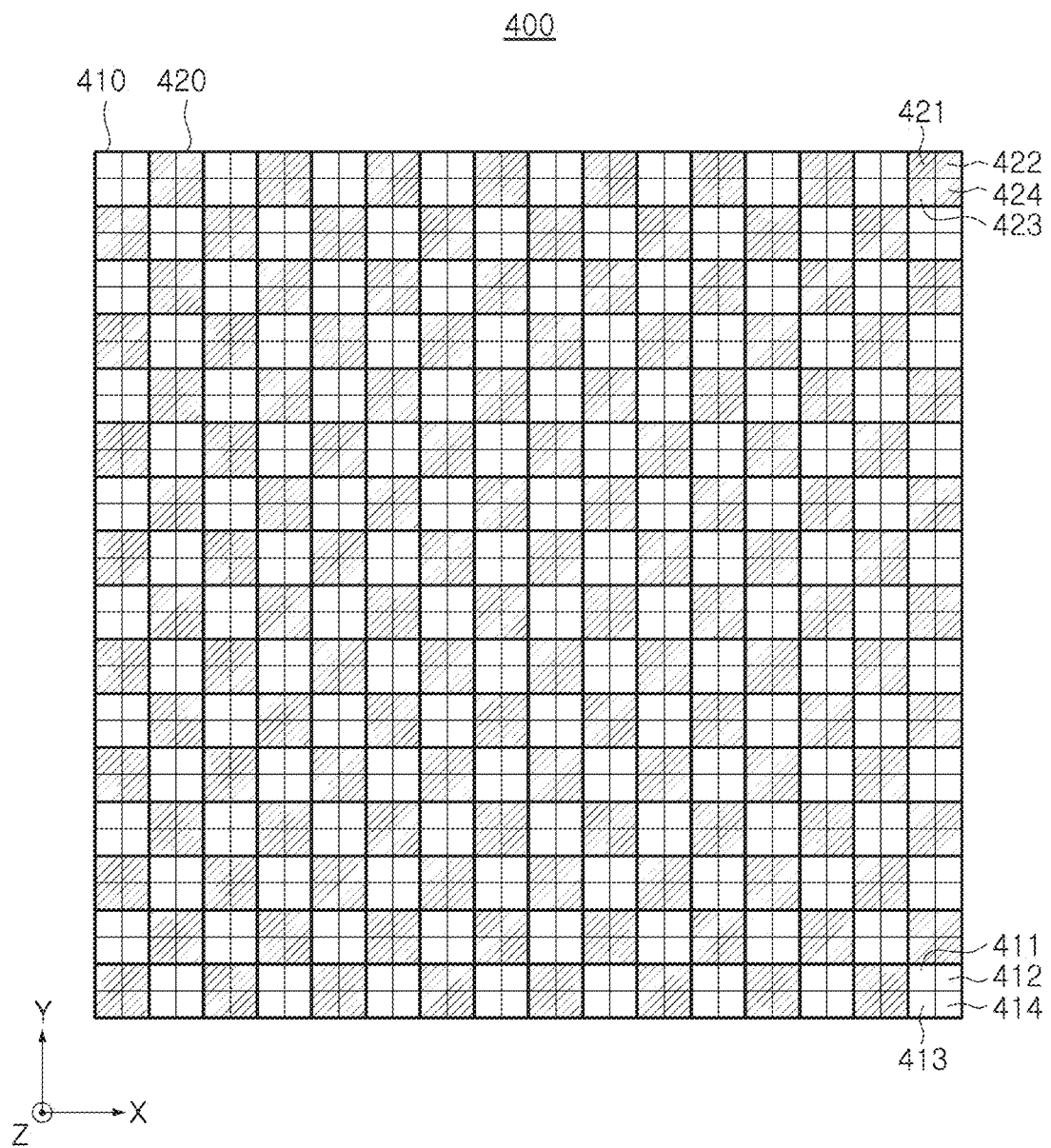
FIG. 17 is a schematic diagram of a pixel array included in an imaging device according to some example embodiments.

FIG. 17 is a schematic diagram of a pixel array included in an imaging device according to some example embodiments.

In some example embodiments for example as illustrated in FIG. 17, a pixel array 400 included in an imaging device may include a plurality of pixels 410 and 420 arranged in a first direction (X-axis direction) and a second direction (Y-axis direction). The pixels 410 and 420 may have the same structure.

The pixel array 400 may include first pixels 410 and second pixels 420, and the first pixels 410 and the second pixels 420 may be controlled by photo control signals having different frequencies. As an example, the logic circuit controlling the pixel array 400 may input first photo control signals of a first frequency to the first pixels 410, and may input second photo control signals having a second frequency to the second pixels 420, through row lines extending in the first direction and connected to the pixel array 400.

In some example embodiments for example as illustrated in FIG. 17, each of the first pixels 410 and the second pixels 420 may include four adjacent subpixels 411-414, 421-424. In each of the first pixels 410 and the second pixels 420, four subpixels 411-414 and 421-424 may be arranged in a 2×2 shape. Each of the four subpixels 411-414 and 421-424 may include a photodiode and a pixel circuit, and the pixel circuit may include a photo transistor connected to the photodiode and a driving transistor amplifying the charge of the photodiode and outputting a pixel signal.

For example, the same photo control signal may be input to the subpixels 411-414 disposed in the same position inside the first pixels 410. For example, one photo control signal having the same frequency and phase may be input to the first subpixels 411. Based on the photo control signal input to the first subpixels 411, the photo control signal input to the second subpixels 412 has a phase difference of 90 degrees, the photo control signal input to the third subpixels 413 may have a phase difference of 180 degrees, and photo control signal input to the fourth subpixels 414 may have a phase difference of 270 degrees. Similarly, the same photo control signal may be input to the subpixels 421 to 424 disposed in the same position inside of the second pixels 420.

Figure 18:
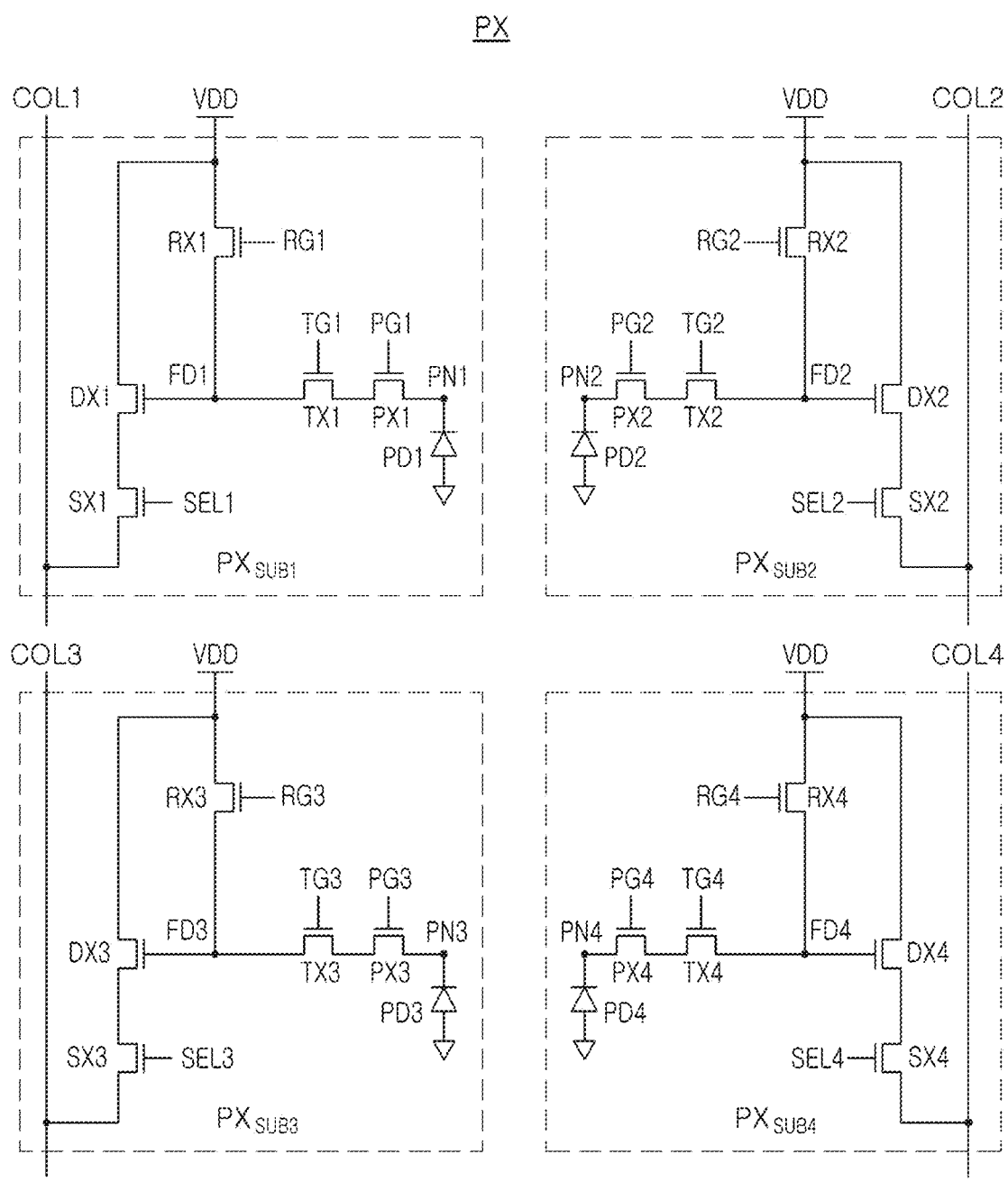
FIG. 18 is a schematic circuit diagram of a pixel of an imaging device according to some example embodiments.

FIG. 18 is a schematic circuit diagram of a pixel of an imaging device according to some example embodiments.

FIG. 18 is a circuit diagram schematically illustrating a pixel PX that may be included in the pixel array 400 described with reference to FIG. 17. Referring to FIG. 18, the pixel PX may include first to fourth subpixels $PX_{SUB1}$-$PX_{SUB4}$. The pixel PX described with reference to FIG. 18 may be applied to both the first pixel 411 and the second pixel 421 according to some example embodiments described with reference to FIG. 17.

The first to fourth subpixels $PX_{SUB1}$ to $PX_{SUB4}$ may have the same structure, and as an example, referring to the first subpixel $PX_{SUB1}$, may each include a first photodiode PD1 and a pixel circuit connected to the first photodiode PD1 through a first photo node PN1. The pixel circuit may include a photo transistor PX1, a transfer transistor TX1, a floating diffusion FD1, a reset transistor RX1, a driving transistor DX1, a selection transistor SX1, and the like. However, the configuration of the pixel circuit may be variously modified depending on example embodiments. The operation of the pixel circuit may be similar to that described with reference to FIG. 5 above.

The frequency of a photo control signal PG1 input to the photo transistor PX1 may vary according to the pixel PX. For example, when the pixel PX is one of the first pixels 410, the photo control signal PG1 has a first frequency, and when the pixel PX is one of the second pixels 420, the photo control signal PG1 may have a second frequency less than the first frequency. For example, when the pixel PX is one of the first pixels 410, the photo control signal PG1 has the same frequency and phase as the first reference signal used to generate the optical control signal, and may have a duty ratio of 1/2.

The photo control signals PG2-PG4 input to the second to fourth subpixels $PX_{SUB2}$-$PX_{SUB4}$ may have the same frequency as the photo control signal PG1 input to the first subpixel $PX_{SUB1}$. In addition, the photo control signal PG2 input to the second subpixel $PX_{SUB2}$ has a phase difference of 90 degrees from the photo control signal PG1 input to the first subpixel $PX_{SUB1}$, and the photo control signal PG3 input to the third subpixel $PX_{SUB3}$ has a phase difference of 180 degrees from the photo control signal PG1. The photo control signal PG4 input to the fourth subpixel $PX_{SUB4}$ may have a phase difference of 270 degrees from the photo control signal PG1. The logic circuit of the imaging device may generate distance information between the subject and the pixel PX by using the raw data obtained from the first to fourth subpixels $PX_{SUB1}$-$PX_{SUB4}$.

Figure 19:
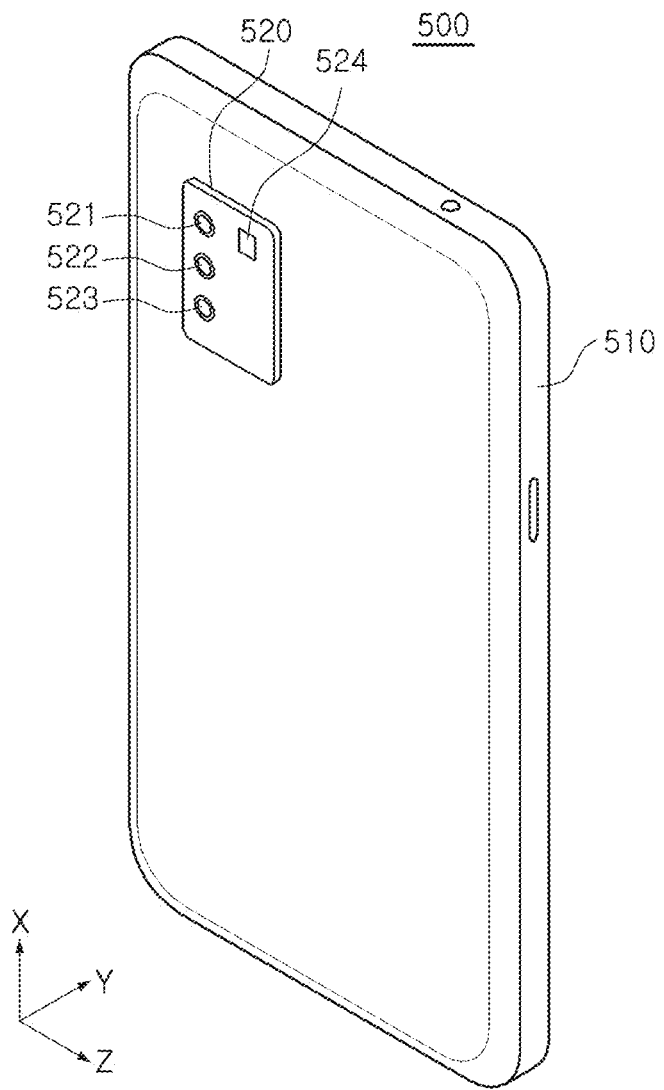
FIGS. 19 to 21 are diagrams schematically illustrating an electronic device including an imaging device according to some example embodiments.
Figure 20:
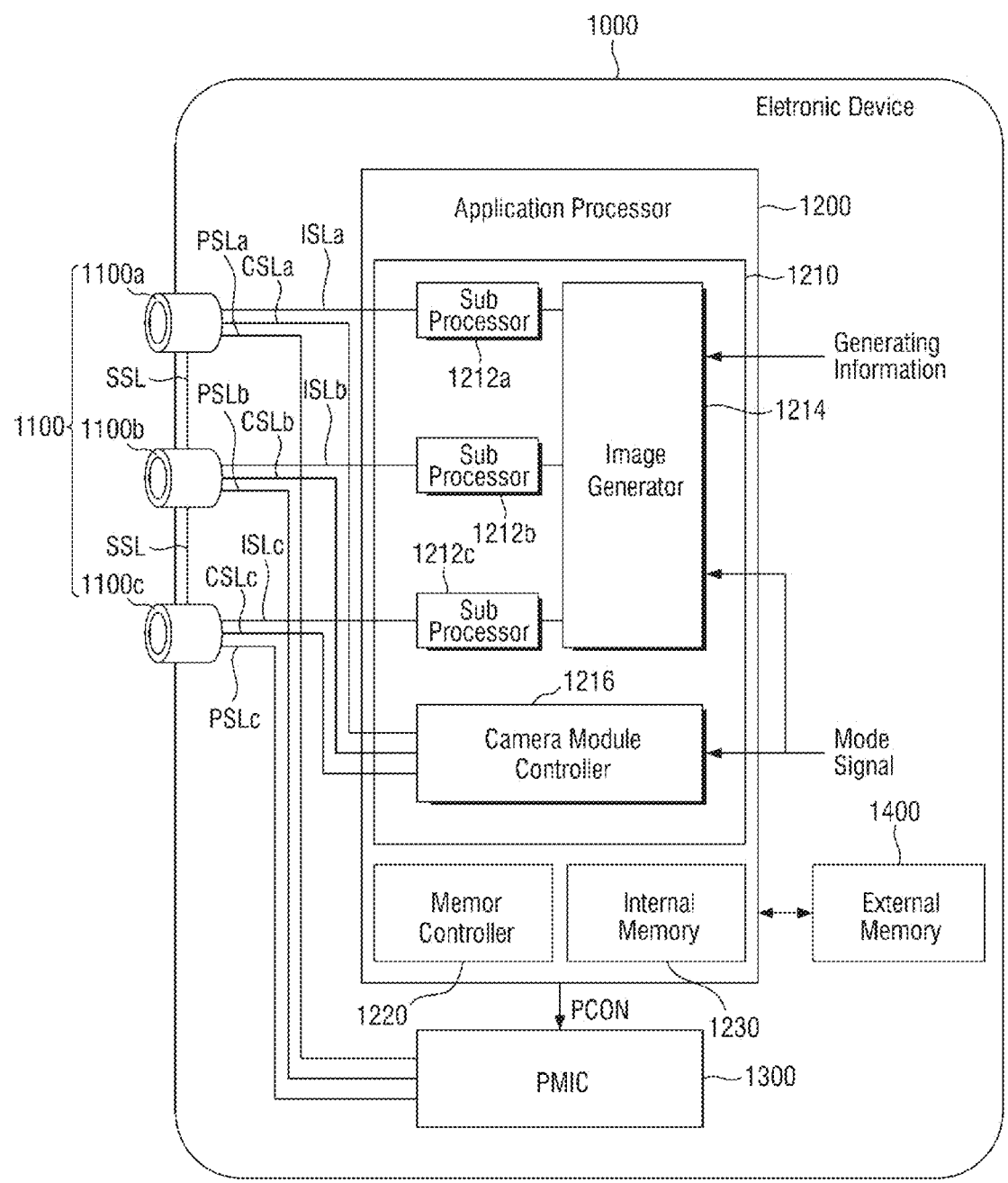
Figure 21:
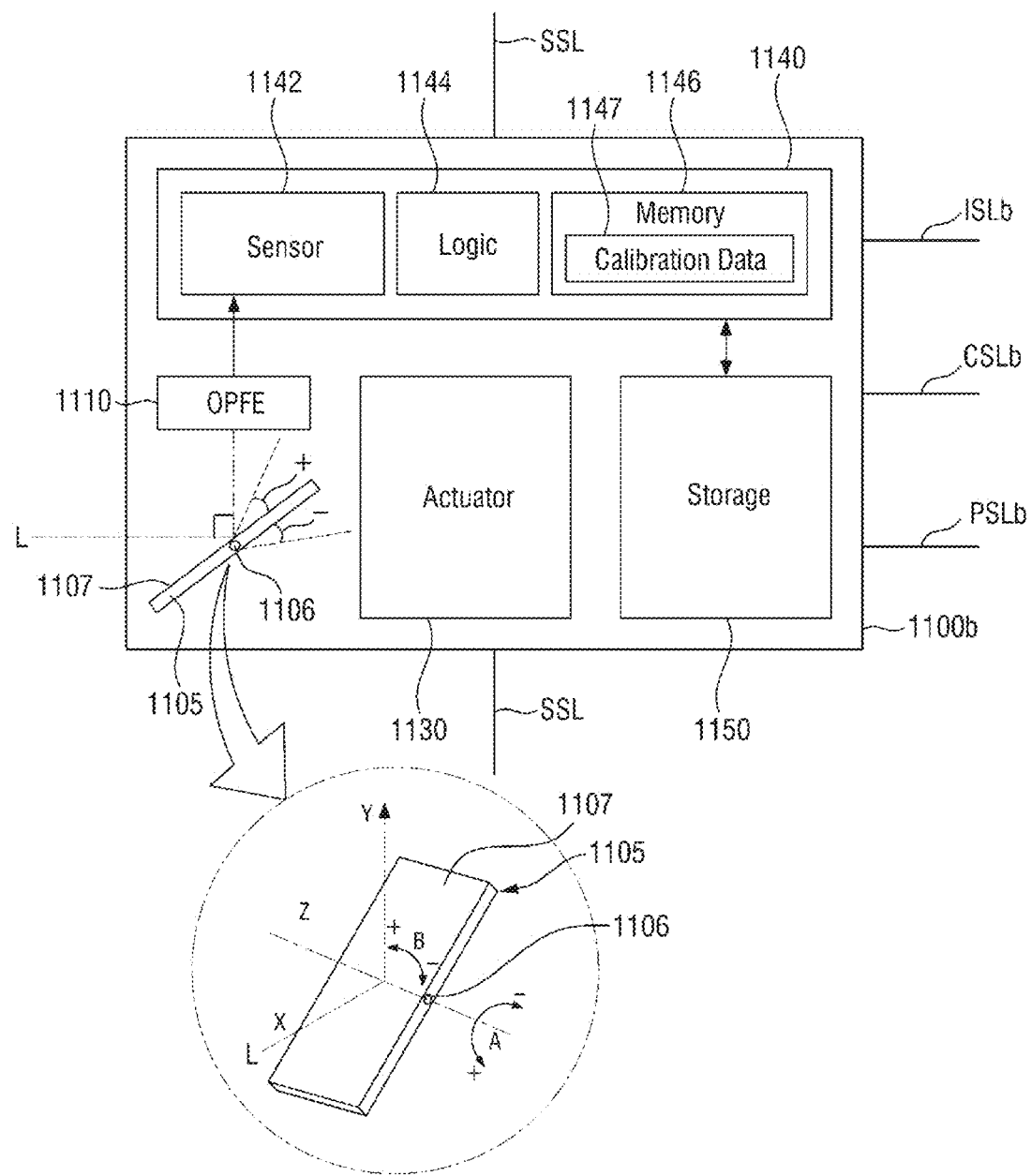

FIGS. 19 to 21 are diagrams schematically illustrating an electronic device including an imaging device according to some example embodiments.

FIG. 19 may be a diagram schematically illustrating the appearance of an electronic device 500 including an imaging device according to some example embodiments. FIG. 19 illustrates that the electronic device 500 is a mobile device, for example, a smart phone, but this is only an example and is not necessarily limited to this type. For example, the electronic device 500 according to some example embodiments may be widely applied to devices such as at least one of a TV, a desktop computer, a monitor, a refrigerator, and the like, as well as devices requiring security such as a door lock or an ATM, in addition to the mobile device.

Referring to FIG. 19, the electronic device 500 may include a housing 510 and a camera unit 520. The camera unit 520 may be additionally disposed on the front surface of the housing 510 on which the display is disposed, as well as on the rear surface of the housing 510. The camera unit 520 may include a plurality of cameras 521 to 523, a light source 524, and the like.

At least one of the plurality of cameras 521 to 523 may be an imaging device according to some example embodiments. For example, the imaging device may drive the light source 524 mounted in the camera unit 520 with a predetermined optical control signal. In some example embodiments, the optical control signal may be a signal generated by multiplying a first reference signal having a first frequency and a second reference signal having a second frequency lower than the first frequency.

Light output by a light source operated by the optical control signal may be reflected from the subject and incident on the pixel array of the imaging device, as a light reception signal. The light reception signal may have a specific (or, alternatively, predetermined) phase difference from the optical control signal, and the imaging device may generate a depth image including a subject by calculating a phase difference between the optical control signal and the light reception signal. A detailed operation of the imaging device may be understood according to the example embodiments described above with reference to FIGS. 1 to 18.

Next, referring to FIG. 20, an electronic device 1000 may include a camera module group 1100, an application processor 1200, a PMIC 1300, and an external memory 1400.

The camera module group 1100 may include a plurality of camera modules 1100a, 1100b, and 1100c. Although the drawing illustrates some example embodiments in which three camera modules 1100a, 1100b, and 1100c are disposed, the example embodiments are not limited thereto. In some example embodiments, the camera module group 1100 may be modified to include only two camera modules. Alternatively or additionally, in some example embodiments, the camera module group 1100 may be modified and implemented to include n (where n is a natural number of 4 or more) camera modules. In addition, in some example embodiments, at least one of the plurality of camera modules 1100a, 1100b, and 1100c included in the camera module group 1100 may be implemented as an imaging device according to one of the example embodiments described above with reference to FIGS. 1 to 18.

Hereinafter, a detailed configuration of the camera module 1100b will be described in more detail with reference to FIG. 21, but the following description may be equally applied to other camera modules 1100a and 1100b according to some example embodiments.

Referring to FIG. 21, the camera module 1100b may include a prism 1105, an optical path folding element (hereinafter referred to as "OPFE") 1110, an actuator 1130, an image sensing device 1140, and a storage unit 1150.

The prism 1105 may include a reflective surface 1107 of a light reflecting material to change the path of light L incident from the outside.

In some example embodiments, the prism 1105 may change the path of the light L, incident in the first direction X, to the second direction Y, perpendicular to the first direction X. In addition, the prism 1105 may rotate the reflective surface 1107 of the light reflecting material in a direction around a central axis 1106, or may rotate the central axis 1106 in B direction, to change the path of the light L incident in the first direction X to be incident in the second direction, a vertical direction. In this case, the OPFE 1110 may also move in a third direction Z, perpendicular to the first direction X and the second direction Y.

In some example embodiments, as illustrated, a large, e.g. a maximum rotation angle of the prism 1105 in the A direction is 15 degrees or less in the positive (+) A direction, and may be greater than 15 degrees in the negative (−) A direction, but embodiments are not limited thereto.

In some example embodiments, in the positive (+) or negative (−) B direction, the prism 1105 may move between 20 degrees, or between 10 degrees and 20 degrees, or between 15 degrees and 20 degrees, and in this case, the angle of movement may be at the same angle there as, in the positive (+) or negative (−) B direction, or may be almost the same angle there as in the range of around 1 degree.

In some example embodiments, the prism 1105 may move the reflective surface 1106 of the light reflective material in a third direction (e.g., the Z direction) parallel to the extending direction of the central axis 1106.

The OPFE 1110 may include, for example, an optical lens comprised of m (where m is a natural number) groups. The m lenses may move in the second direction Y to change the optical zoom ratio of the camera module 1100b. For example, when the basic optical zoom ratio of the camera module 1100b is Z, in the case in which m optical lenses included in the OPFE 1110 are moved, the optical zoom ratio of the camera module 1100b may be changed to 3Z, 5Z, or 5Z or higher optical zoom ratio.

The actuator 1130 may move the OPFE 1110 or an optical lens, (hereinafter, referred to as an optical lens), to a specific position. For example, the actuator 1130 may adjust the position of the optical lens such that the image sensor 1142 is positioned at a focal length of the optical lens for accurate sensing.

The image sensing device 1140 may include an image sensor 1142, a control logic 1144, and a memory 1146. The image sensor 1142 may sense an image of a sensing target using light L provided through an optical lens. The control logic 1144 may control the overall operation of the camera module 1100b. For example, the control logic 1144 may control the operation of the camera module 1100b according to a control signal provided through a control signal line CSLb.

The memory 1146 may store information required for the operation of the camera module 1100b, such as calibration data 1147. The calibration data 1147 may include information necessary for/used for the camera module 1100b to generate image data using light L provided from externally. The calibration data 1147 may include, for example, at least one of information on a degree of rotation described above, information on a focal length, information on an optical axis, and the like. For example, when the camera module 1100b is implemented in the form of a multi-state camera in which a focal length is changed depending on the position of the optical lens, the calibration data 1147 may include a focal length value for each position (or state) of the optical lens and information related to auto focusing.

The storage unit 1150 may store image data sensed through the image sensor 1142. The storage unit 1150 may be disposed outside of the image sensing device 1140 and may be implemented in a form stacked with a sensor chip constituting the image sensing device 1140. In some example embodiments, the storage unit 1150 may be implemented as an Electrically Erasable Programmable Read-Only Memory (EEPROM), but example embodiments are not limited thereto.

Referring to FIGS. 20 and 21 together, in some example embodiments, each of the plurality of camera modules 1100a, 1100b, and 1100c may include the actuator 1130. Accordingly, each of the plurality of camera modules 1100a, 1100b, and 1100c may include the same or different calibration data 1147 according to the operation of the actuator 1130 included therein.

In some example embodiments, one camera module (e.g., 1100b) among the plurality of camera modules 1100a, 1100b and 1100c may be a folded lens type camera module including the prism 1105 and the OPFE 1110 described above, and the other camera modules (for example, 1100a, 1100b) may be vertical camera modules that does not include the prism 1105 and the OPFE 1110, but the embodiments are not limited thereto.

In some example embodiments, one camera module (e.g., 1100c) among the plurality of camera modules 1100a, 1100b and 1100c may be a vertical type of depth camera for extracting depth information using, for example, Infrared Ray (IR). In this case, the application processor 1200 may merge image data provided from the depth camera with image data provided from another camera module (for example, 1100a or 1100b), thereby generating a 3D depth image.

In some example embodiments, at least two camera modules (e.g., 1100a and 1100b) among the plurality of camera modules 1100a, 1100b, and 1100c may have different fields of view. In this case, for example, optical lenses of at least two camera modules (e.g., 1100a and 1100b) among the plurality of camera modules 1100a, 1100b, and 1100c may be different from each other, but the configuration is not limited thereto.

Alternatively or additionally, in some example embodiments, fields of view of the plurality of camera modules 1100a, 1100b, and 1100c may be different from each other. In this case, the optical lenses included in the plurality of respective camera modules 1100a, 1100b, and 1100c may also be different from each other, but the configurations thereof are not limited thereto.

In some example embodiments, the plurality of camera modules 1100a, 1100b, and 1100c may be physically separated from each other and disposed. For example, the sensing area of one image sensor 1142 is not divided and used by the plurality of camera modules 1100a, 1100b, and 1100c, but an independent image sensor 1142 may be disposed inside of each of the plurality of camera modules 1100a, 1100b, and 1100c. In addition, at least one of the plurality of camera modules 1100a, 1100b, and 1100c may include a ToF sensor that generates a depth image based on distance information from the subject.

Referring back to FIG. 20, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented by being separated from each other as separate semiconductor chips.

The image processing device 1210 may include a plurality of sub-image processors 1212a, 1212b and 1212c, an image generator 1214, and a camera module controller 1216.

The image processing device 1210 may include a plurality of sub-image processors 1212a, 1212b, and 1212c corresponding to the number of the plurality of camera modules 1100a, 1100b, and 1100c.

Image data generated from the camera modules 1100a, 1100b, and 1100c, respectively, may be provided to the corresponding sub-image processors 1212a, 1212b, and 1212c through image signal lines ISLa, ISLb, and ISLc separated from each other. For example, image data generated from the camera module 1100a is provided to the sub-image processor 1212a through an image signal line ISLa, the image data generated from the camera module 1100b is provided to the sub-image processor 1212b through an image signal line ISLb, and the image data generated from the camera module 1100c may be provided to the sub-image processor 1212c through the image signal line ISLc. Such image data transmission may be performed using, for example, a camera serial interface (CSI) based on a Mobile Industry Processor Interface (MIPI), but example embodiments are not limited thereto.

On the other hand, in some example embodiments, one sub-image processor may be disposed to correspond to a plurality of camera modules. For example, the sub-image processor 1212a and the sub-image processor 1212c are not implemented separately from each other as illustrated, but may be implemented by being integrated into one sub-image processor. In this case, image data provided from the camera module 1100a and the camera module 1100c may be selected through a selection element (e.g., a multiplexer) or the like, and then provided to the integrated sub-image processor.

Image data provided to the respective sub-image processors 1212a, 1212b, and 1212c may be provided to the image generator 1214. The image generator 1214 may generate an output image using image data provided from the respective sub-image processors 1212a, 1212b, and 1212c according to the image generating information or a mode signal.

In detail, the image generator 1214 may merge at least portions of the image data generated from the camera modules 1100a, 1100b, and 1100c having different fields of view and may generate an output image, according to the image generation information or the mode signal. In addition, the image generator 1214 may generate an output image by selecting any one of image data generated from camera modules 1100a, 1100b, and 1100c having different fields of view according to image generation information or the mode signal.

In some example embodiments, the image generation information may include a zoom signal or zoom factor. Alternatively or additionally, in some example embodiments, the mode signal may be, for example, a signal based on a mode selected from a user.

For example, when the image generation information is or includes a zoom signal (zoom factor) and the camera modules 1100a, 1100b and 1100c have different fields of view (viewing angles), the image generator 1214 may operate differently depending on the type of the zoom signal. For example, when the zoom signal is a first signal, after merging the image data output by the camera module 1100a and the image data output by the camera module 1100c, an output image may be generated using the merged image signal and image data output by the camera module 1100b that is not used for merging. For example, in a case in which the zoom signal is a second signal different from the first signal, the image generator 1214 does not perform such image data merging, and may select any one of the image data output by the camera modules 1100a, 1100b and 1100c and may generate an output image. However, embodiments are not limited thereto, and a method of processing image data may be variously modified and implemented as needed.

In some example embodiments, the image generator 1214 may receive a plurality of image data having different exposure times, from at least one of the plurality of sub-image processors 1212a, 1212b and 1212c, and may perform high dynamic range (HDR) processing for the plurality of image data, thereby generating merged image data having an increased dynamic range.

The camera module controller 1216 may provide a control signal to the respective camera modules 1100a, 1100b, and 1100c. The control signal generated from the camera module controller 1216 may be provided to the corresponding camera modules 1100a, 1100b, and 1100c through control signal lines CSLa, CSLb, and CSLc separated from each other.

Any one of the plurality of camera modules 1100a, 1100b and 1100c may be designated as a master camera (e.g., 1100b) according to image generation information including a zoom signal or a mode signal, and the remaining camera modules (e.g., 1100a and 1100c) may be designated as slave cameras. Such information may be included in the control signal and provided to the corresponding camera modules 1100a, 1100b, and 1100c through the control signal lines CSLa, CSLb, and CSLc separated from each other.

Camera modules operating as masters and slaves may be changed according to a zoom factor or an operation mode signal. For example, when the field of view of the camera module 1100a is wider than that of the camera module 1100b and the zoom factor thereof provides a relatively low zoom ratio, the camera module 1100b may operate as a master, and the camera module 1100a may operate as a slave. Conversely, when the zoom factor indicates a relatively high zoom ratio, the camera module 1100a may operate as a master and the camera module 1100b may operate as a slave.

In some example embodiments, a control signal provided from the camera module controller 1216 to the respective camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving the sync enable signal generates a sync signal based on the received sync enable signal, and may transmit the generated sync signal to the camera modules 1100a and 1100c through a sync signal line SSL. The camera module 1100b and the camera modules 1100a and 1100c may be synchronized with such a sync signal to transmit image data to the application processor 1200.

In some example embodiments, a control signal provided from the camera module controller 1216 to the plurality of camera modules 1100a, 1100b, and 1100c may include mode information based on the mode signal. Based on this mode information, the plurality of camera modules 1100a, 1100b, and 1100c may operate in a first operation mode and a second operation mode in relation to the sensing speed.

In the first operation mode, the plurality of camera modules 1100a, 1100b, and 1100c may generate an image signal at a first rate (for example, generate an image signal at a first frame rate), and may encode the generated image signal at a second rate higher than the first rate (for example, encode an image signal having a second frame rate higher than the first frame rate), and may transmit the encoded image signal to the application processor 1200. In this case, the second speed may be 30 times or less of the first speed.

The application processor 1200 stores the received image signal, for example, the encoded image signal, in a memory 1230 provided therein or in a storage 1400 outside of the application processor 1200, and then, may read the encoded image signal from the memory 1230 or the storage 1400 and decode the read signal, and may display image data generated based on the decoded image signal. For example, a corresponding subprocessor among the plurality of subprocessors 1212a, 1212b, and 1212c of the image processing device 1210 may perform decoding, and may also perform image processing on the decoded image signal.

The plurality of camera modules 1100a, 1100b, and 1100c may generate an image signal at a third rate lower than the first rate in the second operation mode, (for example, generate an image signal having a third frame rate lower than the first frame rate), and may transmit the image signal to the application processor 1200. The image signal provided to the application processor 1200 may be an unencoded signal. The application processor 1200 may perform image processing on the received image signal or may store the image signal in the memory 1230 or the storage 1400.

The PMIC 1300 may supply power, such as a power voltage, to the plurality of respective camera modules 1100a, 1100b, and 1100c. For example, under the control of the application processor 1200, the PMIC 1300 may supply first power to the camera module 1100a through the power signal line PSLa, supply the second power to the camera module 1100b through the power signal line PSLb, and supply third power to the camera module 1100c through the power signal line PSLc.

The PMIC 1300 generates power corresponding to each of the plurality of camera modules 1100a, 1100b, and 1100c in response to a power control signal PCON from the application processor 1200, and may also adjust the power level. The power control signal PCON may include a power adjustment signal for each operation mode of the plurality of camera modules 1100a, 1100b, and 1100c. For example, the operation mode may include a low power mode, and in this case, the power control signal PCON may include information on a camera module operating in a low power mode and a set power level. Levels of powers provided to the plurality of camera modules 1100a, 1100b, and 1100c may be the same as or different from each other. Also, the level of power may be dynamically changed.

As set forth above, according to some example embodiments, by operating a light source of an imaging device with an optical control signal generated using a first reference signal of a first frequency and a second reference signal of a second frequency, a large, e.g. a maximum distance that may be measured by the imaging device may be increased. Alternatively or additionally, first pixels of the imaging device may be driven by a photo control signal of a first frequency, second pixels thereof may be driven by a photo control signal of a second frequency, and data obtained from the second pixels may be adjusted using data obtained from the first pixels, thereby generating a depth image having improved/excellent noise characteristics.

Example embodiments are not limited to those described above. For example, none of the example embodiments described above are necessarily mutually exclusive with one another. For example, some example embodiments may include features described with reference to one or more of the above figures, and may also include other features described with reference to another or more of the above figures.

Any of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While some example embodiments have been illustrated and described above, it will be apparent to those of ordinary skill in the art that modifications and/or variations could be made without departing from the scope of inventive concepts as defined by the appended claims.

What is claimed is:

1. An imaging device comprising:
a light source configured to be operated by an optical control signal that is generated using a combination of a first reference signal having a first frequency and a second reference signal having a second frequency different from the first frequency for each frame period of a plurality of frame periods;
a plurality of pixels, each of the plurality of pixels including a photodiode configured to generate an electrical charge in response to a light reception signal output by the light source and reflected from a subject, and a pixel circuit configured to output a pixel signal corresponding to the electrical charge of the photodiode; and
a logic circuitry configured to generate raw data to generate a depth image using the pixel signal,
wherein the plurality of pixels includes first pixels and second pixels, and
the logic circuitry is configured to input a first photo control signal having the first frequency to the pixel circuit connected to the photodiode in each of the first pixels, and is configured to input a second photo control signal having the second frequency to the pixel circuit connected to the photodiode in each of the second pixels.

2. The imaging device of claim 1, wherein the second frequency is less than the first frequency.

3. The imaging device of claim 2, wherein the first frequency is an integer multiple of the second frequency.

4. The imaging device of claim 1, wherein a number of the first pixels is greater than or equal to a number of the second pixels.

5. The imaging device of claim 4, wherein the number of the first pixels is an integer multiple of the number of the second pixels.

6. The imaging device of claim 1, wherein the plurality of pixels are arranged in a first direction and a second direction that intersects the first direction, and
each of the second pixels is adjacent to a portion of the first pixels in the first direction and the second direction.

7. The imaging device of claim 1, wherein the first pixels and the second pixels have same structure.

8. The imaging device of claim 1, wherein the first photo control signal includes a plurality of first photo control signals, each of the plurality of first photo control signals having a phase difference of one of 0 degrees, 90 degrees, 180 degrees, and 270 degrees with respect to the first reference signal, and
the second photo control signal includes a plurality of second photo control signals, each of the plurality of second photo control signals having a phase difference of one of 0 degrees, 90 degrees, 180 degrees, and 270 degrees with respect to the second reference signal.

9. The imaging device of claim 8, wherein in each of the first pixels and the second pixels, the pixel circuit includes first to fourth pixel circuits sharing the photodiode, and
each of the first to fourth pixel circuits includes a photo transistor connected to the photodiode, and a driving transistor configured to amplify the electrical charge of the photodiode to generate the pixel signal.

10. The imaging device of claim 9, wherein the photo transistors included in the first to fourth pixel circuits of each of the first pixels are configured to receive the plurality of first photo control signals, and the photo transistors included in the first to fourth pixel circuits of each of the second pixels are configured to receive the plurality of second photo control signals.

11. The imaging device of claim 8, wherein each of the first pixels and the second pixels includes four of subpixels adjacent to each other, and
each of the subpixels includes the photodiode and the pixel circuit, and the pixel circuit of each of the subpixels includes a single phototransistor connected to the photodiode, and a driving transistor configured to amplify the electrical charge of the photodiode to generate the pixel signal.

12. The imaging device of claim 11, wherein the single phototransistors included in the pixel circuits in each of the first pixels are configured to receive the plurality of first photo control signals, and the single phototransistors included in the pixel circuits in each of the second pixels are configured to receive the plurality of second photo control signals.

13. The imaging device of claim 1, wherein the logic circuit is configured to generate the optical control signal by multiplying the first reference signal and the second reference signal.

14. An imaging device comprising:
a light source configured to be operated by an optical control signal generated using a first reference signal having a first frequency and using a second reference signal having a second frequency different from the first frequency;
a sensor including a plurality of pixels configured to generate a pixel signal in response to a light reception signal output by the light source and reflected from a subject and a logic circuitry configured to generate raw data using the pixel signal, the plurality of pixels including first pixels configured to operate in synchronization with first photo control signals having the first frequency and second pixels configured to operate in synchronization with second photo control signals having the second frequency; and
an image processor configured to calculate distance information of the subject, using the raw data,
wherein the raw data includes first raw data corresponding to the first pixels and second raw data corresponding to the second pixels, and
the image processor is configured to calculate the distance information of the subject, and then correct the second raw data using the first raw data corresponding to two or more first neighboring pixels adjacent to each of the second pixels from among the first pixels.

15. The imaging device of claim 14, wherein the first frequency is greater than the second frequency, and
a number of the first pixels is greater than a number of the second pixels.

16. The imaging device of claim 14, wherein the first pixels and the second pixels are arranged in a first direction and a second direction that intersects the first direction, and the second pixels are respectively adjacent to the first neighboring pixels in the first direction and the second direction.

17. The imaging device of claim 14, wherein the first photo control signals have a phase difference of one of 0 degrees, 90 degrees, 180 degrees, and 270 degrees with respect to the first reference signal, and the second photo control signals have a phase difference of one of 0 degrees, 90 degrees, 180 degrees, and 270 degrees with respect to the second reference signal, and the image processor is configured to modify the second raw data by matching phases of the first photo control signals input to each of the first neighboring pixels and the second photo control signals input to each of the second pixels.

18. The imaging device of claim 17, wherein the image processor is configured to generate a depth image illustrating the subject, using the first raw data and the second raw data modified.

19. The imaging device of claim 14, wherein the image processor is configured to replace the second raw data with an arithmetic average of the first raw data corresponding to the first neighboring pixels.

20. An imaging device comprising:
a clock driver circuitry configured to output first photo control signals having a first frequency, and second photo control signals having a second frequency lower than the first frequency;
a pixel array having first pixels configured to receive the first photo control signals and second pixels configured to receive the second photo control signals;
a readout circuitry connected to the pixel array through a plurality of column lines; and
a light source configured to be controlled by an optical control signal having a second frequency different from the second photo control signal, the optical control signal generated using a combination of a first reference signal having a first frequency and a second reference signal having a second frequency for each frame period of a plurality of frame periods.

* * * * *